(12) United States Patent
Velicescu

(10) Patent No.: US 10,191,710 B2
(45) Date of Patent: Jan. 29, 2019

(54) METHODS AND SYSTEMS OF LARGE SCALE VIDEO DISPLAY

(71) Applicant: Adrian Velicescu, Los Angeles, CA (US)

(72) Inventor: Adrian Velicescu, Los Angeles, CA (US)

(73) Assignee: StandardVision LLC, Los Angeles, CA (US)

( * ) Notice: Subject to any disclaimer, the term of this patent is extended or adjusted under 35 U.S.C. 154(b) by 0 days.

(21) Appl. No.: 15/367,080

(22) Filed: Dec. 1, 2016

(65) Prior Publication Data
US 2017/0115947 A1    Apr. 27, 2017

Related U.S. Application Data

(63) Continuation of application No. 14/558,116, filed on Dec. 2, 2014, now abandoned, which is a continuation of application No. 12/132,816, filed on Jun. 4, 2008, now Pat. No. 8,928,559.

(60) Provisional application No. 60/941,758, filed on Jun. 4, 2007, provisional application No. 61/014,901, filed on Dec. 19, 2007, provisional application No.
(Continued)

(51) Int. Cl.
| | |
|---|---|
| *G06F 3/14* | (2006.01) |
| *G06Q 30/02* | (2012.01) |
| *G06Q 30/06* | (2012.01) |
| *G06Q 40/04* | (2012.01) |
| *G09F 9/302* | (2006.01) |
| *G09G 3/32* | (2016.01) |
| *G06Q 30/08* | (2012.01) |

(52) U.S. Cl.
CPC ........... *G06F 3/1446* (2013.01); *G06Q 30/02* (2013.01); *G06Q 30/0268* (2013.01); *G06Q 30/0601* (2013.01); *G06Q 40/04* (2013.01); *G09F 9/3026* (2013.01); *G09G 3/32* (2013.01); *G06F 3/1423* (2013.01); *G06Q 30/0261* (2013.01); *G06Q 30/0645* (2013.01); *G06Q 30/08* (2013.01); *G09G 2300/026* (2013.01); *G09G 2330/021* (2013.01)

(58) Field of Classification Search
CPC ....... G06F 3/1446; G09F 9/3026; G09G 3/32; G09G 2300/026; G09G 2330/021; G06Q 30/0261; G06Q 30/0645; G06Q 30/08
USPC ........................................... 348/383; 345/1.2
See application file for complete search history.

(56) References Cited

U.S. PATENT DOCUMENTS

| | | | | |
|---|---|---|---|---|
| 6,101,750 A | * | 8/2000 | Blesener ................. | G09F 13/04 340/815.53 |
| 6,252,564 B1 | * | 6/2001 | Albert .................... | B41J 3/4076 345/1.3 |

(Continued)

*Primary Examiner* — Nicholas Lee
*Assistant Examiner* — Ngan T Pham Lu
(74) *Attorney, Agent, or Firm* — Sheppard, Mullin, Richter & Hampton LLP; Daniel N. Yannuzzi

(57) ABSTRACT

In embodiments of the present invention, improved capabilities are described for displaying and managing dynamic, multi-media, video content presentation on an architectural scale. Methods and systems described include associating a video display with an advertising marketplace and leasing rights to a video display. A plurality of physical panel, rod, curtain, blade, and fin video display arrays are described, as are methods and systems for managing and editing video for display and powering a video display that is associated with an architectural feature.

18 Claims, 39 Drawing Sheets

Related U.S. Application Data

61/030,412, filed on Feb. 21, 2008, provisional application No. 61/046,837, filed on Apr. 22, 2008, provisional application No. 61/048,580, filed on Apr. 29, 2008.

(56) References Cited

U.S. PATENT DOCUMENTS

| | | | |
|---|---|---|---|
| 2005/0138438 A1* | 6/2005 | Bodas | G06F 1/3287 713/300 |
| 2007/0282522 A1* | 12/2007 | Geelen | G01C 21/26 701/532 |
| 2007/0284941 A1* | 12/2007 | Robbins | H04L 12/10 307/2 |
| 2008/0268936 A1* | 10/2008 | Piccionelli | G01S 5/0027 463/16 |

* cited by examiner

METHODS AND SYSTEMS OF LARGE SCALE VIDEO DISPLAY

CROSS-REFERENCE TO RELATED APPLICATIONS

This application claims the benefit of the following provisional applications, each of which is hereby incorporated by reference in its entirety: U.S. Provisional App. No. 60/941,758 filed on Jun. 4, 2007; U.S. Provisional App. App. No. 61/014,901 filed on Dec. 19, 2007; U.S. Provisional App. App. No. 61/030,412 filed on Feb. 21, 2008; U.S. Provisional App. App. No. 61/046,837 filed on Apr. 22, 2008; and U.S. Provisional App. App. No. 61/048,580 filed on Apr. 29, 2008.

BACKGROUND

Field

The invention is related to powering, installing, configuring, operating, and managing lighting systems, video display panels and similar facilities for dynamic, multimedia, video content presentation on an architectural scale.

Description of the Related Art

LED video display panels may be mounted to architectural components to create large scale video displays, but current methods are limited in their ability to aggregate power and data management systems, and to efficiently manage video displays, including large scale architectural video display panels, as well as lighting systems, such as architectural accent lighting, decorative lighting, and other lighting, in particular lighting systems using light sources with low power requirements, such as LEDs. Therefore, there is a need for a method and system for displaying and managing dynamic, multi-media, video content presentation on an architectural scale.

SUMMARY

Aspects of the present invention relate to improved methods and systems that may be used for displaying and managing dynamic, multi-media, video content presentation on an architectural scale.

In embodiments, a multi-panel video display may be used on an architectural feature for presenting a media content. Rights may be leased, in a time share manner, to one or more content providers to display content on the multi-panel video display. The leasing rights may include the rights to provide advertising content, or some other type of content.

In embodiments, a content provider may be an advertiser.

In embodiments, the multi--panel video display may be coordinated across panels within the display to present a unified content that spans the multi-panel video display, associated with a software editor for managing the presentation of the content, associated with at least one power cable associated with at least one data cable. A data cable may be an Ethernet cable, and the like.

In embodiments, a power cable may be an Ethernet cable.

In embodiments, the multi-panel video display may be associated with at least one data cable.

In embodiments, the data cable may be an Ethernet cable.

In embodiments, the architectural feature may be a building façade, a plurality of building façades, an internal building feature, a wall, a gable, a cornice, a sign, a temporary architectural feature, and the like.

In embodiments, the media content may be an image, a sound, a multi-media content, and the like.

In embodiments, a term of the lease of the multi-panel video display may be a based at least in part on a prospective lessee's bid received within a bidding platform.

In embodiments, the bidding platform may include a listing of an attribute of the display, where the attribute may be selected from the group consisting the size of the display, historical revenues associated with the display, the density of the population in proximity to the display, the distance from which the display can be viewed, or the traffic within a viewing distance of the display, and the like.

In embodiments, the multi-panel video display may be associated with at least one power cable.

In embodiments, the power cable may be an Ethernet cable.

In embodiments, the multi-panel video display may be associated with at least one data cable.

In embodiments, the data cable may be an Ethernet cable.

In embodiments, a computer-readable medium containing computer instructions may be provided. A multi-panel video display may be used on an architectural feature for presenting a media content; and rights may be leased to display content on the multi-panel video display to one or more content providers for presenting the media content in a time share manner. In embodiments, leasing the rights may include teasing rights to provide advertising content. In embodiments, the multi-panel video display may be coordinated across panels within the display to present a unified content that spans the multi-panel video display. In embodiments, the multi-panel video display may be associated with a software editor for managing the presentation of the content. In embodiments, the multi-panel video display may be associated with at least one power cable. In embodiments, the power cable may be an Ethernet cable. In embodiments, the multi-panel video display may be associated with at least one data cable. In embodiments, the data cable may be an Ethernet cable.

In embodiments, a multi-panel video display may be used on an architectural feature for presenting media content. Rights may be sold to provide content for the multi-panel video display to one or more content providers for presenting the media content, where the content owners may be different from the owners of the architectural feature.

In embodiments, a multi-panel video display may be provided on an architectural feature for presenting media content. A revenue may be shared derived from presentation of the media content to the multi-panel video display between an owner of the multi-panel display and an owner of the building on which the architectural feature may be disposed. In embodiments, sharing the revenue derived from presentation of the content to the multi-panel video display may be between an owner of the multi-panel display, an owner of the architectural feature, an owner of the content, and the like. In embodiments, the revenue may be based at least in part on a pay-per-view content, pay-per-predicted view of content, size of the multi-panel video display, population density, within a vicinity of the multi-panel video display, number of visitors to the vicinity of the multi-panel video display, and the like.

In embodiments, an advertising marketplace may be associated with a multi-panel architectural video display. A plurality of attributes may be presented that may be associated with the multi-panel architectural video display within the advertising marketplace. A bid for content may be received to be displayed on the architectural video display, wherein the bid includes an amount and at least one attribute selected from the plurality of attributes. In embodiments, the attribute may be display size, a time of content presentation, a location of content presentation, duration of content presentation, a frequency of content presentation, an environmental factor associated with the display, an environmental factor associated with population density within a vicinity of the display, an environmental factor associated with a number of visitors within a vicinity of the display, and the like.

In embodiments, an advertising marketplace may be associated with a multi-panel architectural video display. A plurality of attributes associated with a broadcast channel may be presented to be displayed on the multi-panel architectural video display within the advertising marketplace. A bid may be received to display the broadcast channel on the architectural video display, wherein the bid includes an amount and at least one attribute selected from the plurality of attributes. In embodiments, the broadcast channel may be associated with an owner of the architecture associated with the architectural video display.

In embodiments, a plurality of glass rods may be provided associated with light emitting diodes. A connector may be provided to arrange the plurality of glass rods to obtain a panel of glass rods configured to display a media content, and the media content may be displayed on the panel of glass rods based at least in part on using the tight emitting diodes. In embodiments, associating the panel of glass rods may be associated with an architectural element. In embodiments, the connector may be associated with at least one power cable. In embodiments, the power cable may be an Ethernet cable, where the connector may be associated with at least one data cable. In embodiments, the data cable may be an Ethernet cable. In embodiments, the display may be coordinated across the plurality of glass rods within the panel of glass rods to present a unified content that spans the plurality of glass rods. In embodiments, the display may be associated with a software editor for managing the presentation of the media content.

In embodiments, a plurality of glass rods may be provided, each of which may be embedded with at least one light emitting diode. A connector may be provided to arrange the plurality of glass rods to obtain a panel of glass rods configured to display a media content. The media content may be displayed on the panel of glass rods based at least in part on using the light emitting diodes. In embodiments, the panel of glass rods may be associated with an architectural element. In embodiments, the connector may be associated with at least one power cable. In embodiments, the power cable may be an Ethernet cable. In embodiments, the connector may be associated with at least one data cable. In embodiments, the data cable may be an Ethernet cable.

In embodiments, a portable, modular LED video display panel may be provided, wherein each display panel may be configured to interlock with a plurality of such modular display panels to form an array. The display panel may be placed at a geographic boundary between a first site and a second site. Facing the display panel may face towards the first site, where content presented on the display panel may be witnessed by an occupant of the first site. A content to the video panel array may be displayed. In embodiments, the site may be a construction site and the array may be configured as part of a temporary boundary for the construction site, an event site and the array may be configured as part of a temporary boundary for the event site, and the like. In embodiments, the display may be coordinated across panels within the display to present a unified content that spans the multi-panel video display. In embodiments, the multi-panel video display may be associated with a software editor for managing the presentation of the content. In embodiments, the display panel may be a multi-sided display panel, where the multi-sided display panel may be a two-sided display panel. In embodiments, the geographic boundary may be a temporary boundary, a portable boundary, a transportable boundary, and the like. In embodiments, the first site may be a geographic location adjacent to a construction site. In embodiments, the second site may be a construction site. In embodiments, the video panel array may be associated with at least one power cable, where the power cable may be an Ethernet cable. In embodiments, the video panel array may be associated with at least one data cable, where the data cable may be an Ethernet cable.

In embodiments, one or more modular, portable LED video display panels may be provided, where the one or more LED video display panels may be configured to interlock with each other to create a video panel array. The video panel array may be associated with a movable object. A media content may be displayed on the video panel array. In embodiments, the video panel array may be associated with at least one power cable, where the power cable may be an Ethernet cable. In embodiments, the video panel array may be associated with at least one data cable, where the data cable may be an Ethernet cable.

In embodiments, a plurality of video display curtain elements may be provided, each of the plurality of video display curtain elements may include a curtain mounting facility, one or more light emitting diodes, a plurality of video display curtain connectors, and the like, where the curtain connectors each may include an LED light source, a substantially spherical reflecting element, and the like. A connector may be provided to arrange the plurality of video display curtain elements to obtain a two-dimensional display surface. In addition, a media content may be displayed onto the two-dimensional display surface. In embodiments, the connector may be associated with at least one power cable, where the power cable may be an Ethernet cable. In embodiments, the connector may be associated with at least one data cable, where the data cable may be an Ethernet cable.

In embodiments, a plurality of video display curtain elements may be provided, including each of the plurality of video display curtain elements comprising a curtain mounting facility, one or more light emitting diodes, a plurality of video display curtain connectors, and the like, where the curtain connectors may each include an LED tight source and a substantially spherical reflecting element. A connector may be provided to arrange the plurality of video display curtain elements to obtain a three-dimensional display surface, where two-dimensional media content may be displayed onto the three-dimensional display surface. In embodiments, the connector may be associated with at least one power cable, where the power cable may be an Ethernet cable. In embodiments, the connector may be associated with at least one data cable, where the data cable may be an Ethernet cable.

In embodiments, a plurality of video display curtain elements may be provided, each of the plurality of video display curtain elements including a curtain mounting facility, one or more light emitting diodes, a plurality of video display curtain connectors, and the like, where the curtain connectors may each include an LED light source, a substantially spherical reflecting element and the like. A connector to arrange the plurality of video display curtain elements may be provided to obtain a three-dimensional display surface. A software editor associated with the video display curtain elements may be provided for managing the display of a two-dimensional media content on the three-dimensional display surface, where the management may include a display criterion enabling the two-dimensional media content to display on the three-dimensional display surface without distortion of the two-dimensional media content. The two-dimensional media content may be displayed on the three-dimensional display surface based at least in part on the display criterion received from the software editor. In embodiments, the connector may be associated with at least one power cable, where the power cable may be an Ethernet cable. In embodiments, the connector may be associated with at least one data cable, where the data cable may be an Ethernet cable.

In embodiments, a plurality of display panel slats may be provided, where each of the plurality of display panel slats may be associated with at least one light emitting diode. A connector to link the plurality of display panel slats into a video slat array may be provided. A connector mount may be provided to associate the video slat array with a building element. In addition, a media content may be displayed on the video slat array. In embodiments, the connector may be associated with at least one power cable, where the power cable may be an Ethernet cable. In embodiments, the connector may be associated with at least one data cable, where the data cable may be an Ethernet cable.

In embodiments, a plurality of display panel slats may be provided, where each of the plurality of display panel slats may be associated with at least one light emitting diode. A connector to link the plurality of display panel slats into a video slat array may be provided, where the connector may enable the adjustment of distance between the plurality of display panel slats within the video slat array. A connector mount may be provided to associate the video slat array with a building element. In addition, a media content may be displayed on the video slat array. In embodiments, the video slat array may be associated with an audio system, a cooling system, and the like. In embodiments, the adjustment of the distance between the plurality of display panel slats with the video slat array may be made by sliding at least one display panel slat in association with the connector, by pivoting at least one display panel slat in association with the connector, and the like embodiments, the connector may be associated with at least one power cable, where the power cable may be an Ethernet cable. In embodiments, the connector may be associated with at least one data cable, where the data cable may be an Ethernet In embodiments, a plurality of display panel slats may be provided, where each of the plurality of display panel slats may be associated with at least one light emitting diode. A connector may be provided to link the plurality of display panel slats into a video slat array. A software editor associated with the video slat array may be provided for managing the presentation of a high definition media content to the array. The high definition media content may be displayed to the video slat array and may be based at least in part on a display criterion received from the software editor. In embodiments, the connector may be associated with at least one power cable, where the power cable may be an Ethernet cable. In embodiments, the connector may be associated with at least one data cable, where the data cable may be an Ethernet cable.

In embodiments, a large scale video display may be provided, where the video display may include a plurality of fins where each fin may be configured to project at an angle from a façade, which may facilitate viewing from an angle substantially acute to the façade. In addition, video content may be coordinated across a plurality of fins. In embodiments, the fins may be rotatably disposed on the façade, thereby allowing the fins to project at different angles from the façade. In embodiments, coordinated video content may be provided for the fins and for a video display disposed flat on the façade. In embodiments, a video display may be provided on a face and on an edge of each of the plurality of fins. In embodiments, the video display may be coordinated across each of the faces and each of the edges among the plurality of fins. In embodiments, the video display may include a first media content on at least one face and a second media content on at least one edge. In embodiments, the video display may be alternated between the face and the edge of each of the plurality of fins. In embodiments, the plurality of fins may be associated with an audio system, with a cooling system, and the like. In embodiments, the video content may be high definition video content. In embodiments, the large scale video display may be associated with a software editor for managing the presentation of the content. In embodiments, the connector may be associated with at least one power cable, where the power cable may be an Ethernet cable. In embodiments, the connector may be associated with at least one data cable, where the data cable may be an Ethernet cable.

In embodiments, a computer-readable medium containing computer instructions may be provided, which may include a large scale video display. The video display may include a plurality of fins, where each fin may be configured to project at an angle from a façade, thereby facilitating viewing from an angle substantially acute to the façade. In addition, video content may be coordinated across a plurality of fins. In embodiments, the fins may be rotatably disposed on the façade, thereby allowing the fins to project at different angles from the façade. In embodiments, coordinated video content may be provided for the fins and for a video display disposed flat on the façade. In embodiments, a video display may be provided on a face and on an edge of each of the plurality of fins.

In embodiments, a plurality of video display panel slats may be provided. Each of the plurality of video display panel slats may have a panel face and a panel edge, wherein the panel face and the panel edge may be each associated with at least one light emitting diode. A connector to link the plurality of video display panel slats may be provided, wherein the connector comprises a rotation facility for rotating the plurality of video display panel slats. In embodiments, the connector may be associated with at least one power cable, where the power cable may be an Ethernet cable. In embodiments, the connector may be associated with at least one data cable, where the data cable may be an Ethernet cable.

In embodiments, a plurality of video display panel slats may be provided. Each of the plurality of video display panel slats may have a panel face and a panel edge, wherein the panel face and the panel edge may each be associated with at least one light emitting diode. A connector to link the plurality of video display panel slats may be provided, wherein the connector may include a rotation facility for rotating the plurality of video display panel slats. In addition, a high definition video content may be provided on at least one of the panel faces and at least one of the panel edges. In embodiments, the display between the panel face and the panel edge may be temporally alternated. In embodiments, a first media content may be displayed on at least one panel face and a second media content on at least one panel edge. In embodiments, the display of the content across each of the panel faces and each of the panel edges may be coordinated. In embodiments, the connector may be associated with at least one power cable, where the power cable may be an Ethernet cable. In embodiments, the connector may be associated with at least one data cable, where the data cable may be an Ethernet cable.

In embodiments, a plurality of video display panel slats may be provided, each of the plurality of video display panel slats having a panel face and a panel edge, wherein the panel face and the panel edge may each be associated with at least one light emitting diode. A connector to link the plurality of video display panel slats may be provided, wherein the connector comprises a rotation facility for rotating the plurality of video display panel slats. A connector mount to associate the linked plurality of video display panel slats with an architectural element may be provided. A high definition media content may be displayed on at least one of the panel faces and at least one of the panel edges. In embodiments, the display between the panel face and the panel edge may be temporally alternated. In embodiments, a first media content may be displayed on at least one panel face and a second media content on at least one panel edge. In embodiments, the display of the content across each of the panel faces and each of the panel edges may be coordinated. In embodiments, the connector may be associated with at least one power cable, where the power cable may be an Ethernet cable. In embodiments, the connector may be associated with at least one data cable, where the data cable may be an Ethernet cable.

In embodiments, a computer program may be provided with a user interface allowing editing a stream of HI) video content. In the user interface, allowing a single stream of HD video content may be allowed to be disposed over a plurality of objects, where the objects may correspond in shape to a plurality of video displays. In embodiments, taking the edited stream of HD video content may be taken and configured for display on a plurality of video displays corresponding to the objects in the user interface. In embodiments, editing the HD video content may include video encoding, video conversion, non-linear video editing, and the like.

In embodiments, a computer-readable medium containing computer instructions may be provided. A computer program with a user interface may be provided to allow editing a stream of HD video content. In the user interface, a single stream of HD video content may be allowed to be disposed over a plurality of objects, where the objects may correspond in shape to a plurality of video displays 3208.

In embodiments, a computer program product for managing the display of a high definition video content may be provided. The computer program product may include a computer usable storage medium having computer-readable program code embodied in the medium executable by a processing unit. The computer-readable program code may include instructions to divide an input video stream into a plurality of mutually exclusive video streams, instructions to edit each of the plurality of video streams, instructions to map each edited video stream with a corresponding video display panel of a plurality of video display panels, instructions to present each edited video stream on the corresponding video display panel of the plurality of video display panels where the plurality of video display panels are coordinated to display the high definition video content, and the like.

In embodiments, a computer program product for managing the display of a high definition video content on a multi-panel video display mounted on a building may be provided. The computer program product may include a computer usable storage medium having computer-readable program code embodied in the medium executable by a processing unit. The computer-readable program code may include instructions to collect a plurality of video streams, instructions to map each of the plurality of the video streams to a corresponding video display panel of the multi-panel video display, instructions to coordinate each video display panel of the multi-panel video display to display a coordinated video content, and the like.

In embodiments, a computer program product for managing the display of a high definition video content associated with a sound system of a plurality of sound systems may be provided. The computer program product may include a computer usable storage medium having computer-readable program code embodied in the medium executable by a processing unit. The computer-readable program code may include instructions to collect a plurality of video streams, instructions to map each of the plurality of the video streams to a corresponding video panel display of a multi-panel video display, instructions to coordinate each video panel display of the multi-panel video display to display a coordinated video content, instructions to associate the coordinated video content with a corresponding sound system of the plurality of sound systems, wherein the sound system may be associated based on location of the multi-panel video display, and the like.

In embodiments, a computer program product for managing the display of a high definition video content associated with a sound system on a multi-panel video display may be provided. The computer program product may include a computer usable storage medium having computer-readable program code embodied in the medium executable by a processing unit. The computer-readable program code may include instructions to collect a plurality of video streams, instructions to map each of the plurality of the video streams to a corresponding video panel display of the multipanel video display, instructions to coordinate each video panel display of the multi-panel video display, instructions to associate the coordinated video content with a corresponding sound system of the plurality of sound systems, wherein the sound system may be associated based on a location of the multi-panel video display, instructions to display simultaneously the coordinated video content along with the corresponding sound system on the multi-panel video display, wherein the multi-panel video display may be provided on a plurality of locations, and the like.

In embodiments, a video display panel may be provided, which may include power to the video display panel using an Ethernet-based system. In addition, a content on the video display panel may be displayed using at least in part the power provided by the Ethernet-based system. In embodiments, the video display panel may be a multi-panel video display, may be associated with an architectural feature, and the like. In embodiments, the Ethernet-based system may conform to a power-over-Ethernet standard, such as IEEE 802.3af.

In embodiments, a video display panel may be provided, which may include power to the video display panel using an Ethernet-based system. A data feed to the video display panel may be provided using an Ethernet-based system. A content may be displayed on the video display panel using at least in part the power and the data provided by the Ethernet-based system. In embodiments, the Ethernet-based system may be a plurality of Ethernet-based systems. In embodiments, the data may be associated with data from video editing software. In embodiments, the video display panel may be a multi-panel video display, associated with an architectural feature, and the like.

In embodiments, a video display panel may be provided, wherein the video display panel may be a powered device of an Ethernet system. The video display panel may be associated with a power sourcing equipment of an Ethernet system. The power sourcing equipment may be used to monitor the power consumption of the video display panel. A power supply may be adjusted from the power sourcing equipment to the video display panel upon the power consumption crossing a consumption threshold. In embodiments, the power sourcing equipment may be an end-span power sourcing equipment, a mid-span power sourcing equipment, and the like.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

DETAILED DESCRIPTION

Figure 1:
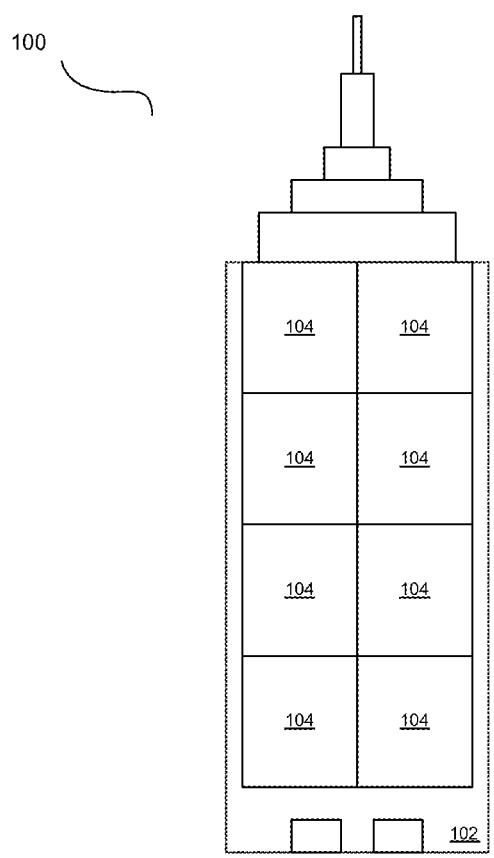
FIG. 1 depicts a simplified embodiment of a multi.-panel video display in an architectural installation.
Figure 2:
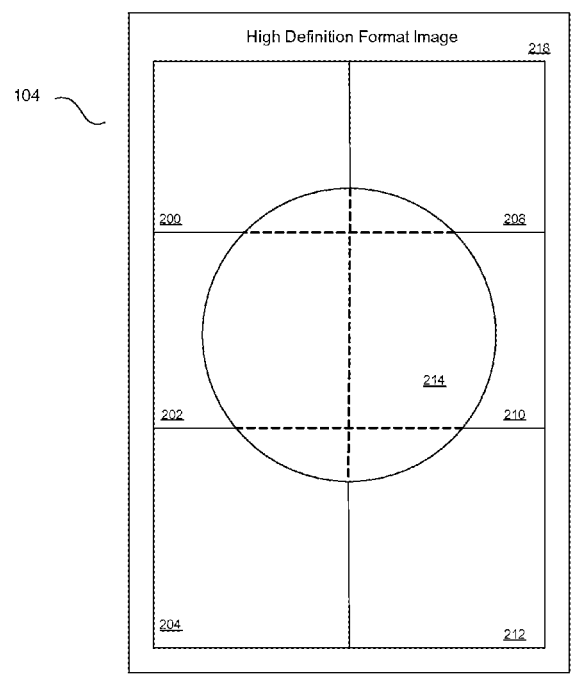
FIG. 2 depicts a simplified schematic of a single high definition format image coordinated to present on multiple video panels.

As shown in FIG. 1, in embodiments, a large-scale, multi-panel video display may be integrated into an architectural installation 100 based at least in part on an LED panel 104, plurality of LED panels 104, or some other video display format, associated with a building structure 102. Video display panels 104 may be coordinated with one another to present a single image, wherein each panel 104 presents a subset of the total information required for presentation of the full image. In the example shown in FIG. 2, a high definition video content 218 may be mapped to multiple video presentation boards 104, each of which comprises individual video boards, such as a Board One 200, Board Two 202, Board Three 204, Board Four 208, Board Five 210, and Board Six 212, as if the video were an image consisting of pixels presenting on a single large screen. In the example depicted in FIG. 2, an image 214 of a circle is presented across the six boards (200, 202, 204, 208, 210, 212). Although, there is no single board with all of the information necessary to present the image of a circle 214, the boards are coordinated in space, time, color, contrast, hue, and so forth, so that, to a viewer, the image of the circle appears to be presented on a single display. Just as the six boards (200, 202, 204, 208, 210, 212) depicted in FIG. 2 may be coordinated to present content as if it were presented from a single display, so too may the separate video display boards 104 composed of the individual panels be coordinated to display a single image as if it were presented from a single display. In embodiments, reformatting software may be used to drop a video into the video presentation areas 104 (e.g., multiple screens) based at least in part on using a template of the building and its corresponding video presentation format. In this manner, multiple video streams may be merged into a single stream where pixels from one area of the video image are mapped for presentation on a single screen within the overall video screen complex. This method and system may permit frame-accurate synchronization. In embodiments, a software program like Flame® software may be used to place sections of a video signal on each section of a high definition signal. In the editing environment, a video editor may drop content for part of the building onto part of the high definition video image being edited. The video may be edited as a single work (e.g., a single HD video stream may be edited using a wide array of video editing functions, such as embodied in commercially available video editing software, such as Flame®), with components of the HD video stream being segmented on the screen (but still as a unified video image) by regions of the screen that correspond to the shapes, relative sizes and relative orientations a series of content display units, such as LED boards. On replay, the video stream is played to the collection of boards, with particular X,Y regions of the video stream being mapped to the particular content display board that corresponds to the region on the screen in the video editing environment. The content may then be presented on multiple video screens from a single video player.

In embodiments, a video presentation board, display, and the like may be based upon LED panels for presenting the video image.

In embodiments, video content may be created on the fly based at least in part on the use of a data bank of information containing sensory information pertaining to a location (e.g., in the vicinity of the video presentation boards). In an example, environmental video sensors may be used to record and/or transmit images of cloud formations to the video presentation boards on a building. This may have, in part, the effect of making the building appear transparent or camouflaged. In another example, the video presentation boards may present images that give the impression that the building is altered into a non-building appearance, such as a hill, fire, or some other image. In another example, the video presentation boards may present images that are associated with some phenomenon occurring in or near the building, for example, showing the occurrence of a store opening, an item going on sale, a congregation of people within the building, or some other phenomenon.

In embodiments, data, including video data, may be collected from video cameras, crews on the ground in advance of the event, live cameras, wireless cameras, environmental sensors e.g., temperature), and this data may be stored in data banks. Software may then be used to analyze the data inputs and respond with data from its own database or from cameras which the program selects to use for an application. In an example, using such a system may enable a video screen to respond to the natural environment around it.

In embodiments, a software program like Flame may be used as an environment for video in large-format displays on buildings. In embodiments, a software program like Flame may be used for reformatting video for large and/or multi-screen architectural video display.

In embodiments, batch processing of video effects may be used to copy and apply a video effect from one video presentation to another.

In embodiments, sun-shading screen may have integrated video elements.

In embodiments, video panel architectural installation may include exterior and interior building installations.

In embodiments, light tubes may work in concert with a video screen to produce an ambient lighting effect that is a companion to the video images being presented. In embodiments, a software program like Flame may be used to coordinate light tubes with video images. In embodiments, DMX-based coding may be used for animation within a light-video image combination.

In embodiments, time lapse video imagery may be presented on architectural video display installations. Time lapse photography and videography may be made using still or motion cameras.

In embodiments, multiple cameras may be used to produce video content where each camera is set at a different angle, shooting on oversized plates at high resolution (e.g., 5000 or 7000 pixels). In embodiments, a software program like Flame may be used to set up lightscape plates and perform camera moves. In embodiments, a software program like Flame may be used to blend a frame with a number of frames from before and after to achieve an effect within the large scale video presentation. In an example, using such a technique, images may blend, fade, appear and disappear, speed or slow down, or achieve some other effect.

In embodiments, video presentation boards in an architectural installation may use a projected sound system (e.g., "sound laser," "HyperSonicSound") installation to broadcast content to a targeted physical location in the environs of the video installation. This may enable a plurality of sounds to emit from a building in association with a video display, or as an adjunct to displaying a video, without having to broadcast high-decibel generalized sound projections. In an example, a building in an urban area may be near a park, an office building and a subway station. The building's installation may selectively target different sounds to be broadcast to each of these locations, for example, the entrance/exit to the office building may receive restaurant advertisements as workers exit the building at lunchtime; the park may receive classical music that is in some way coordinated with the building's video display; the subway station may receive an advertisement for print media that is available at a nearby newsstand, and so forth.

In embodiments, multiple screens may be deployed in the environment surrounding an architectural video installation. In an example, such an installation may enable content to follow a person as he moves in a three-dimensional space.

In embodiments, video presentation boards used in an architectural installation may be deployed as virtual real estate to which the metrics of real estate valuation may be applied. In an example, the video "real estate" may be leased in a time share manner similar to that common to, for example, condominiums. In another example, a land owner with a view of a video presentation board may realize an increase in his land value due to the fact that it will now have a view of the content presented on the video board. This view may be monetized by the video board owners prior to, during, or following installation in much the same manner as other real property or land improvement may be valued, sold, and/or leased.

In embodiments, a media licensing business model may be associated with architectural video installations. In an example, content creators may distribute their work through the architectural video "channel." A channel may be branded for and/or associated with a content creator, a building owner, a landmark, a population, a topic, or some other unifying characteristic related to the content.

In embodiments, an advertising marketplace may be associated with the architectural video displays. In an example, a building owner, content owner, or some other entity associated with the video display may earn a share of revenue derived from the advertising. Examples of the types of revenues that may be derived include, but is not limited to, pay-per-view, pay-per-predicted-views, charge based upon screen size, population density, population flux, transactions, building and/or store visits by customers, or some other revenue metric.

In embodiments, a competitive auction may be used by content holders, content brokers, or some other entity, to bid for the right to present content on an architectural video display. Bidding may be for a time amount, a specific time on a specific day, a specific building, location, or sonic other feature or attribute associated with the video presentation. In an example, video content may be stored in association with attributes of, or relating to, the video content. These attributes may, in turn, form the basis of the bidding for advertising. Examples of attributes may include, but is not limited to, the size of the display, historical revenues associated with the display, the density of the population in proximity to the display, the distance from which the display can be viewed, the traffic within a viewing distance of the display, the size of the advertisement to be displayed, the content of the advertisement to be displayed, the content with which the advertisement will be associated, the duration of the advertisement, and the type of advertisement, or some other attribute.

In embodiments, a building owner may use its video presentation boards to become its own channel fur video content. In an example, the Holocaust Museum may use video installation boards to present a "Human Rights Content Channel" on which it broadcasts content relating to the threats to human rights around the world and what may be done to prevent future tragedies. In a commercial mode, a video presentation board installed on the façade of a car dealership may form a "Lexus Channel" on which it presents content showing beautiful people doing beautiful things in Lexus automobiles. A liquor company may present video images that give the impression that the building is the shape of its liquor bottle, and on forth.

In embodiments, a building may use its video presentation boards to become a temporary channel that is associated with a particular event. In an example, the Hancock Tower in Boston may become the "Boston Marathon Channel" during the running of that event, and revert to a different channel type once the event has concluded.

In embodiments, a building may use its video presentation boards to become a gallery for the presentation of multimedia works. In an example, the works of video artists, such as Bill Viola, may find a broader audience when given a forum in a "Video Museum" that consists of a large, publicly-viewed video installation. In an example, independent filmmakers, photographers and other artists may present their work on similar video installations. In embodiments, artists may rent time for the presentation of their works on such video installations. Gallery owners may present artists that they represent in "virtual gallery spaces." Such virtual gallery spaces may be combined with targeted HyperSonicSound-type audio transmission to convey information about the works that would ordinarily be found on the plaque next to a work, such as a painting, in a traditional three-dimensional gallery space. In another example, a series of video installation boards may be installed at physically separated locations to give a temporal dimension to the viewing of video content. Sequentially-spaced video boards could, in Burma-Shave-like fashion, provide "chapters" to a video narrative with naturally occurring temporal pauses caused by the time required to physically move from one video board to the next. In another example, a building could house a series of elevators, each of which is outfitted with interior video presentation boards covering the elevators' interior surfaces. These video boards may be used to present artworks that customers view while riding the elevators. The elevators may be an end destination built solely for the purpose of viewing artwork or other multimedia content.

In embodiments, video presentation boards may be mounted independently of a building on a tower or other structure and devoted solely, or primarily, for video boards.

In embodiments, architectural video installations may be linked in a media channel comprising multiple locations around the world. In an example, content on screens from a club in Hong Kong may be associated with content from a club in New York.

In embodiments, an architectural video presentation board may be associated with an architectural element, such as a podium, that is independent of the main building structure. An independent architectural element having video display boards, mounted LED's, and the like may be used to create effects, such as giving the appearance of a fire, torch, or other feature. An architectural element, such as an alcove, slot, corner, cove, or some other feature may have video display boards, mounted LED's, and the like that may be used to create effects, such as giving the appearance of a fire, torch, or other feature.

In embodiments, an LED, LED panel or other lighting or video source may be associated with a reflective surface onto which it directs its light emission. The reflective source, such as a mirror, glass, metal surface, or some other reflective source, may redirect the light to create an effect. This reflected light may be further associated with mist, smoke, or some other environmental effect.

In embodiments, an architectural video presentation format may be comprised of glass rods which are associated with LED's. In an example, LED's may be embedded in glass rods and the rods arrayed, for example, in parallel rows. Panels of such parallel rows may be used to present multimedia content. Panels of such parallel rows may be affixed to, or associated with, a building element, such as a building façade, and placed at an angle to the building element in order to, in part, increase the number of viewing angles from which video content on the building may be seen. When the LED's within the glass rods are not illuminated, the rods may be transparent, permitting architectural or other elements behind the rods to be seen. In an example, LED-embedded glass rods used for multimedia presentation may be used to create signage, a multimedia marquee, or some other presentation format.

In embodiments, a building may be constructed in such a manner that the lower floors of the building are void of inhabitable floor space and only the upper sections of the building are designed for habitation with floor space accommodations. In an example, a building constructed in this manner many have the lower portion of the building sheathed in video presentation boards from which content may be broadcast. Such panels may have the effect of disguising the fact that the lower building portion does not have floors or habitable space.

Figure 3:
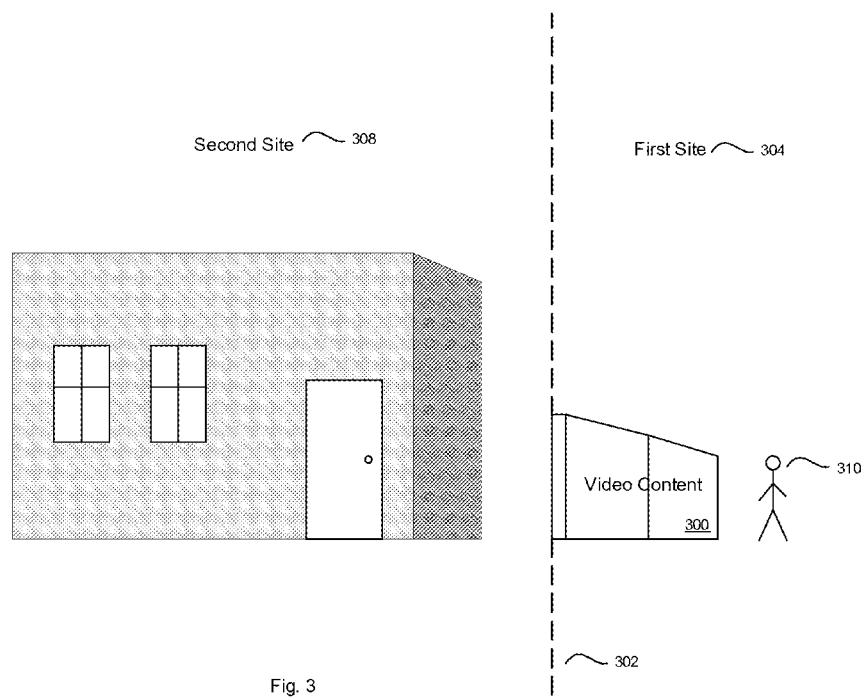
FIG. 3 depicts a temporary LED video display panel array used to barricade an occupant of a first site from entering a second site.

Referring to FIG. 3, an LED video display panel 300, or some other video display panel, may be used as temporary signage. A video display panel 300 may be modular and designed to interlock. In an example, a modular LED video display panel 300 may be configured to interlock with a plurality of LED video display panels. The video display panel may be placed at a geographic boundary 302 of a first site 304 and a second site 308. The video display panel 300 façade may be faced towards the first site 304 so that the content presented on the display panel 300 may be witnessed by an occupant 310 of the first site 304. A plurality of interlocking video display panels may create a video panel array, wherein the array creates a physical impediment to the occupant 310 traversing the geographic boundary 302. Content may be presented on the video panel array, wherein the presentation of the content is coordinated across the video panel array to give the effect of the presentation occurring within a single panel display.

In embodiments, an LED video display panel 300 may be multi-sided. In an example, an LED video display may be two-sided so that occupants facing either side of the panel 300 may see content displayed on the panel.

In embodiments, the geographic boundary 302 at which the LED video display panel 300 is located may be a temporary boundary, a portable boundary, a transportable boundary, or some other type of boundary.

In embodiments, an LED video display panel 300 used as temporary signage may be free-standing, wall-mounted, hanging, vehicle-mounted, or situated in some other manner. A hanging LED video display panel may be hung from an alcove, a crane, a pole, or hung in some other manner. A vehicle-mounted display may be mounted on the flatbed of a truck, on the external walls of a truck trailer, or affixed to a vehicle in some other manner.

In embodiments, temporary signage made of LED video display panels 300 may be placed along each side, above and/or below, a sidewalk to create a tunnel through which pedestrians may pass.

In embodiments, an LED video display panel 300 may be constructed into a form, including but not limited to, a flat panel, a curved panel, a right angle panel, a concave panel, a convex panel, a wave form, a custom form, an asymmetrical form, or some other shape or configuration.

In embodiments, an LED video display panel 300 may be used as temporary signage in, or in association with, a construction site. An LED video display panel 300, or plurality of LED video display panels, may be used to wall the perimeter of a construction site. An video display panel 300, or plurality of LED video display panels, may be used as traffic signage in association with a construction site. An LED video display panel, or plurality of LED video display panels, may be used to present safety warnings and other safety-related information in association with a construction site An LED video display panel, or plurality of LED video display panels, may be used to present shipping information, such as the arrival of a truck containing construction materials, to the workers located at a construction site.

In embodiments, an LED video display panel 300 may be used as temporary signage in, or in association with, road construction. An LED video display panel, or plurality of LED video display panels, may be used as freestanding traffic signs in association with road construction. AR LED video display panel, or plurality of LED video display panels, may be used as billboards to present traffic information in association with road construction.

In embodiments, an LED video display panel 300 may be used as temporary signage in, or in association with, a home remodeling site. An LED video display panel, or plurality of LED video display panels, may be used to present images, video or other content of the remodeling progress, before-after images, or some other content related to the home remodeling.

In embodiments, an LED video display panel 300 may be used as temporary signage in, or in association with, a landscape excavation site. An LED video display panel, or plurality of LED video display panels, may be used to present images, video or other content of the landscaping progress, before-after images, or some other content related to the landscaping site.

In embodiments, an LED video display panel 300 may be used as temporary signage in, or in association with, a convention booth wall-divider. An LED video display panel, or plurality of LED video display panels, may be used to present images, video or other content related to the convention booth contents, the booth sponsor, or some other content associated with the convention and/or convention booth.

In embodiments, an LED video display panel 300 may be used as temporary signage in, or in association with, a dressing room wall-divider. An LED video display panel, or plurality of LED video display panels, may be used to present images, video or other content related to the proprietor associated with the dressing room, products sold by the proprietor, or some other information of relevance to the occupants of the dressing room.

In embodiments, an LED video display panel 300 that is used as temporary signage may present content. Content may include an advertisement. An advertisement may be related to the activities occurring at or near the location of the video panel display, or it may be unrelated to the location of the video panel display. In an example, content relating to a location may include, but is not limited to, advertisements for condo space, advertisements for office space, contractor advertisements, developer advertisements, or some other advertisement content.

In embodiments, an LED video display panel 300 that is used as temporary signage may present live content. Live content may include a live video feed from a location, such as a construction site, inside a building, or some other live content.

In embodiments, an LED video display panel 300 that is used as temporary signage may present artwork. Artwork may include an audio content, a visual content, or an audio-visual content. In an example, LED video display panels may be placed along each side, above and/or below, a sidewalk to create a tunnel through which pedestrians may pass. Within this LED panel tunnel may be presented content forming an environment that provides a pedestrian within the tunnel the experience of being underwater, flying, moving in a vehicle, walking through a building or other location associated with the location of the tunnel, entering an acoustic environment (e.g., countryside, oceanside, music, etc.) or some other experience.

Figure 4:
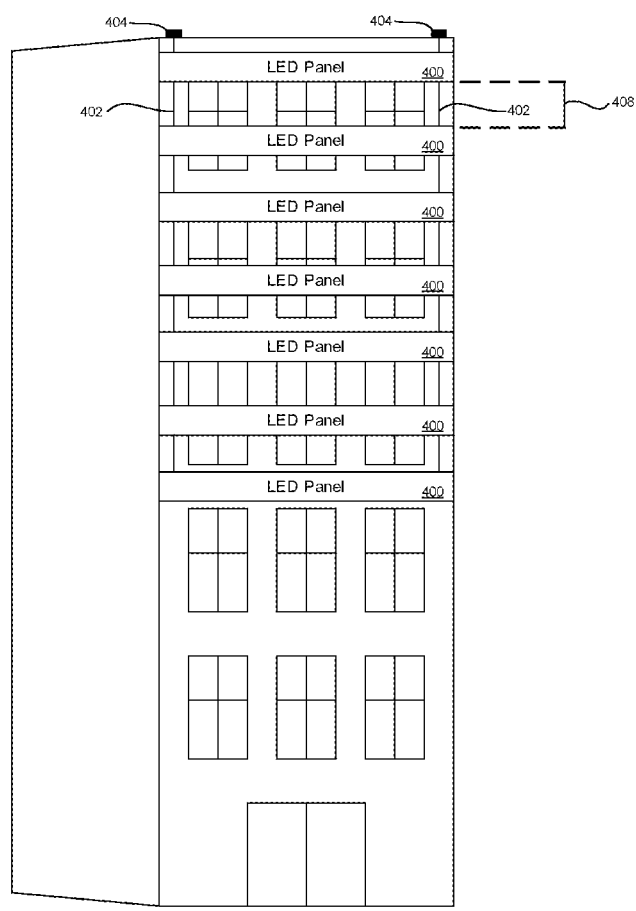
FIG. 4 depicts a spatially adjustable video display comprised of movable video panel slats.

In embodiments, an LED video display panel, or some other video display panel, may be used as temporary or permanent signage. Referring to FIG. 4, an LED video display panel may include a plurality of LED display panel slats 400 that are associated with one another by means of a connector 402. The slats may be horizontal slats, as shown in FIG. 4, vertical slats, or slats arrayed in some other configuration. The connector 402 used to link the slats to one another may be a cable, a rod, a shaft, or some other type of connector. An LED video panel display slat 400 may be made of carbon fiber. In an embodiment, the plurality of LED video display panel slats 400 may be associated with a building façade, in a manner similar to a blind covering a window. The LED video display panel slats 400 may be hung in front of the building façade using a connector mount 404 mounted to the building at the upper portion of the building, rooftop, cornice, or some other portion of the building or façade. This may permit some or all of the LED video display panel slats 400 to be free of separate building mounts that fasten a slat to a building façade. In an embodiment, a subset of LED video display slats 400 may be free of direct mounting to the building façade, and a second subset may be directly mounted to the building façade.

Referring still to FIG. 4, in an embodiment, the distance 408 between the LED video display panel slats 400 may be adjusted. The distance 408 adjustment may be made by moving an LED panel 400, or a plurality of LED panels 400, along the connector 402. The movement of the panels along the connector may be done manually, with the assistance of a motor, in an automated manner, according to a schedule, in response to available natural lighting conditions, or according to some other method. Natural lighting conditions may be measured using a solar cell. A solar cell may be affixed or associated with an LED video panel slat 400. In embodiments, a content may be presented to the LED video display panel slats 400, wherein the presentation of the content is coordinated across the panels 400 to give the effect of the presentation occurring within a single panel display.

In embodiments, the distance 408 created by moving an LED video display panel slat may permit an occupant of the building on which the plurality of slats 400 is mounted to receive natural external light into the building, and to see out of the building.

In embodiments, the presentation of a content to the LED video display panel slats 400 may be adjusted to account for the negative space that is created by the distance between the panels 400. In an example, a plurality of LED video display panel slats 400 with no distance between them may, in combination, present an image of a face where the upper most slat presents the upper third of the face, the middle slat presents the middle third of the face, and the lower slat presents the lower third of the face. As the distance 408 between the panels 400 is increased, the natural spatial relationships among the facial features may remain unchanged (e.g., the space between the lips and eyes may remain constant). However, as the distance between the LED display panels 400 changes, the pixels presented to the panels may change in order to preserve the natural spatial relationships among the facial features. For example, increasing the distance between the upper slat and middle slat may have the effect of forcing the middle slat and lower slat to a lower position on the building façade, causing the middle and lower slats to slide down the facial image. This may have the effect of causing the new, lower position of the lower slat to now depict an image of the neck, and so forth.

In embodiments, the presentation of a content to the LED video display panel slats 400 may be purposefully not adjusted to account for the negative space that is created by the distance between the panels 400 in order to depict a distortion of the content.

Figure 5:
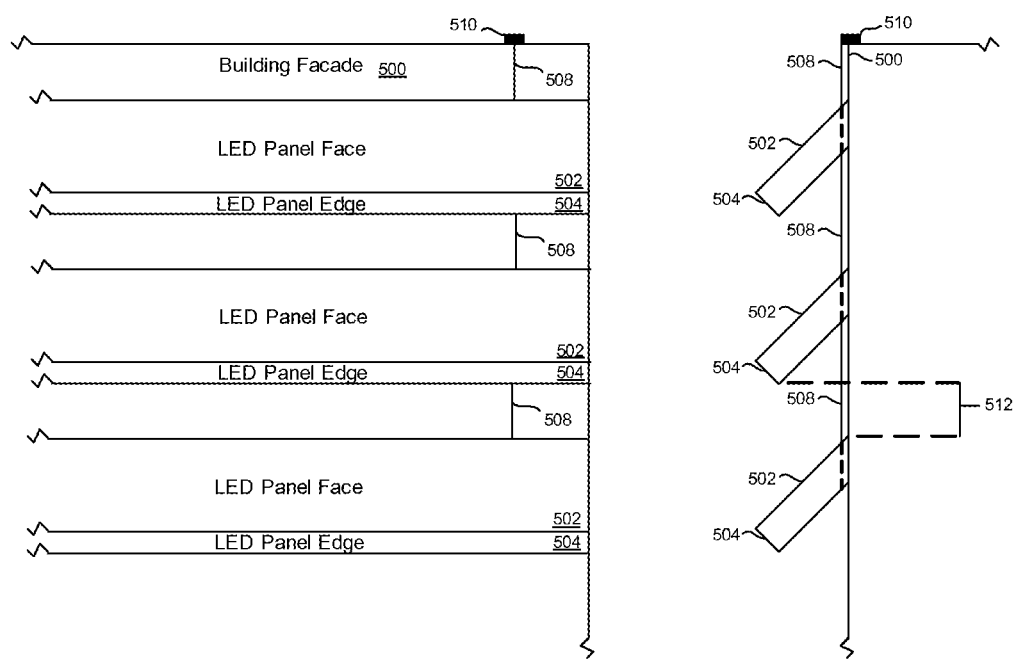
FIG. 5 depicts a spatially adjustable video display comprised of rotating video panel slats.

Referring to FIG. 5, in embodiments an LED video display panel may include a plurality of LED display panel slats, each of which having an LED panel face 502 and an LED panel edge 504. The individual LED display panel slats may be associated with one another by means of a connector 508. The slats may be horizontal slats, as shown in FIG. 5, vertical slats, or slats arrayed in some other configuration. The connector 508 used to link the slats to one another may be a cable, a rod, a shaft, or sonic other type of connector. An LED video panel display slat may be made of carbon fiber. In an embodiment, the plurality of LED video display panel slats may be associated with a building façade 500, in a manner similar to a blind covering a window. The LED video display panel slats may be hung in front of the building façade using a connector mount 510 mounted to the building at the upper portion of the building, rooftop, cornice, or some other portion of the building or façade. This may permit some or all of the. LED video display panel slats to be five of separate building mounts that fasten a slat to the building façade 500. In an alternate embodiment, a subset of LED video display slats may be free of direct mounting to the building façade, and a second subset may be directly mounted to the building façade.

In embodiments, a content may be presented to an LED panel face 502. In embodiments, a content may be presented to an LED panel edge 504. In embodiments, a content may be presented to an LED panel face 502 and an LED panel edge 504, wherein the presentation of the content is coordinated across the face 502 and edge 504 to give the effect of the presentation occurring within a single panel display. In embodiments, a content may be presented to a plurality of LED panel faces 502 and a plurality of LED panel edges 504, wherein the presentation of the content is coordinated across the faces 502 and edges 504 to give the effect of the presentation occurring within a single panel display.

In an embodiment, an LED video display panel slat may be enabled to rotate along an axis. The axis may be along the upper portion of a slat, as depicted in FIG. 5, or the axis may be in located in the middle portion, lower portion, or some other portion of the slat. In an embodiment, the distance 512 between the LED video display panel slats nay be adjusted. The distance 512 adjustment may be made by rotating an LED panel, or a plurality of LED panels, along the connector 508. The rotation of the panels along the connector may be done manually, with the assistance of a motor, in an automated manner, according to a schedule, in response to available natural lighting conditions, or according to some other method. Natural lighting conditions may be measured using a solar cell. A solar cell may be affixed or associated with an LED video panel slat.

In embodiments, the distance 512 created by moving an LED video lay panel slat may permit an occupant of the building on which the plurality of slats is mounted to receive natural external light into the building, and to see out of the building.

In embodiments, as an LED video display panel slat is rotated outwards from a building façade 500, and the LED panel edge 504 becomes visible, a content may be presented to the newly exposed LED panel edge 504. In embodiments, the distribution of the content presentation among a plurality of LED video display panel slats may be based at least in part on the distance 512 between the slats in the plurality.

In embodiments, the presentation of a content to the LED video lay panel slats may be adjusted to account tier the negative space that is created by the distance 512 between the panels.

In embodiments, the presentation of a content to the LED video display panel slats may be purposefully not adjusted to account for the negative space that is created by the distance 512 between the panels in order to depict a distortion of the content.

In embodiments, an LED video display panel may be multi-sided. In an example, an LED video display may be double-side so that occupants facing either side of the panel may see content displayed on the panel.

In embodiments, an LED video panel display may be constructed into a form, including but not limited to, a flat panel, a curved panel, a right angle panel, a concave panel, a convex panel, a wave form, a custom form, an asymmetrical form, or some other shape or configuration.

Figure 6:
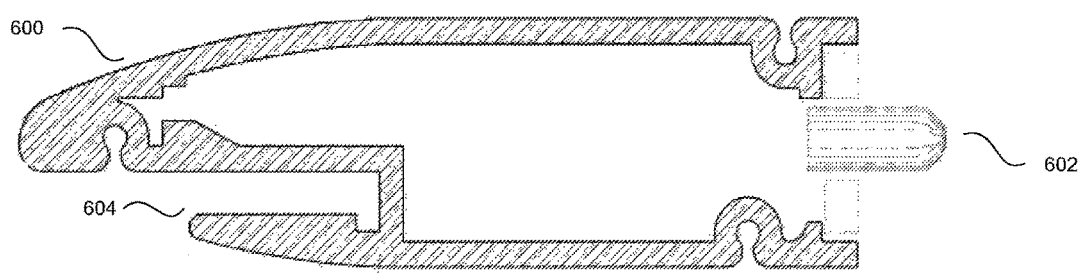
FIG. 6 depicts a cross-section of one embodiment of a video display blade construction.

Referring to FIG. 6, in embodiments, an LED video display panel may be formed in a blade shape in which one edge of the blade 600 may include a mounting section 604, with which a blade may be affixed to a building, a building mount or some other means of securing the blade in an installation, and another edge in which an LED 602 may be mounted. In embodiments, the blade may be hollow, solid, or filled with a substance, such as a sound-dampening foam, or some other material. In embodiments, a blade 600 may be formed as a single piece using a mold or some other forming process. In embodiments, a blade may be assembled using multiple sections. In embodiments, a blade may be made using a carbon fiber, plastic, steel, aluminum, a composite material, or some other material. In embodiments, an LED 602 may be clipped into a socket on the blade 600. A mounting section 604 may be used to secure a mounting bracket or mount on a mullion or some other facility. A mounting section 604 may be used to take power and data through the blade. In embodiments, a gasket may be used to connect two or more blades 600 together.

Still referring to FIG. 6, in embodiments, a blade may be associated with a heat reduction material and/or process. A heat reduction material and/or process may include a heat sink that is associated with a blade, a ventilation system, or some other heat reduction material and/or process. In embodiments, a ventilation system may include, but is not limited to, ventilation holes in a blade, a vacuum and/or fan system that may be used to circulate air, including cooled air, within, across, and/or among a blade or plurality of blades.

Figure 7:
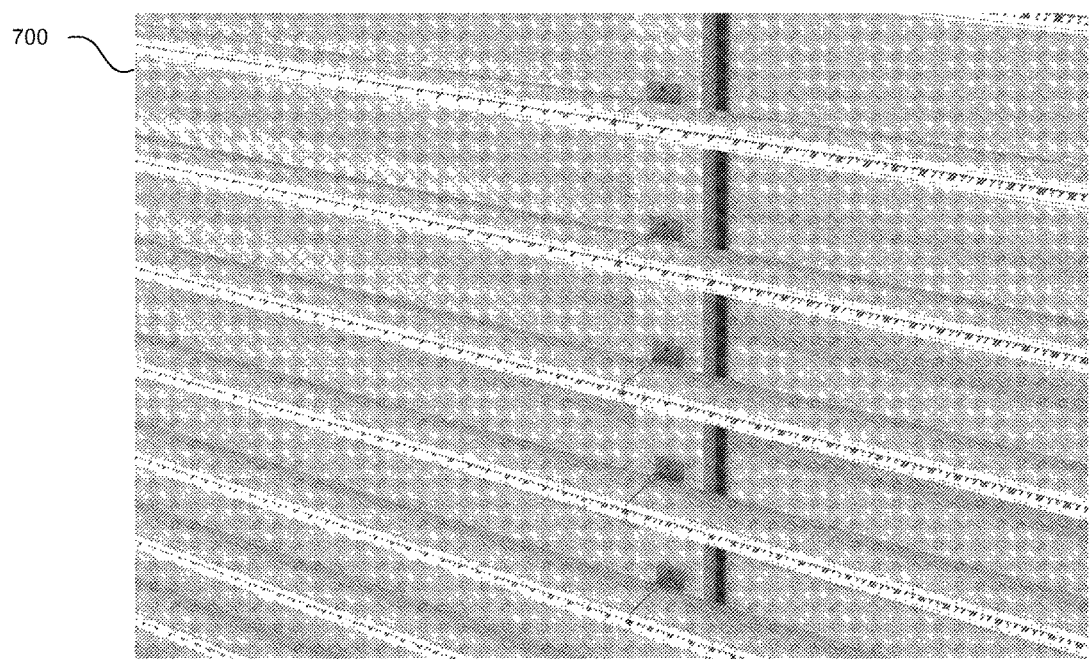
FIG. 7 depicts a simplified schematic of a plurality of video display blades in an installation.

Referring to FIG. 7, in embodiments, a video display installation 700, including a large-scale architectural video display, may include a plurality of LED display blades 600 that are associated with one another by means of a connector. A connector may be associated with a mounting section 604 of a blade or plurality of blades. The blades may be horizontal blades, vertical blades, or blades arrayed in some other configuration. The mounting section 604 used to link blades 600 to one another may be a cable, a rod, a shaft, or some other type of connector. In an embodiment, a plurality of LED video display panel blades 600 may be associated with a building façade, in a manner similar to a blind covering a window. The LED video display panel blades 600 may be hung in front of the building façade using a mounting section 604 mounted to the building at the upper portion of the building, rooftop, cornice, or some other portion of the building or façade. This may permit some or all of the LED video display panel blades 600 to be free of separate building mounts that fasten a slat to a building façade. In an embodiment, a subset of LED video display blades 600 may be free of direct mounting to the building façade, and a second subset may be directly mounted to the building façade. In embodiments, a blade may include a cushion, such as a rubber disc, that may be used to rest the blade against a surface, such as a glass building façade.

In embodiments, a content may be presented to an LED display blade 600. In embodiments, a content may be presented to a plurality of LED display blade edges, wherein the presentation of the content is coordinated across the edges to give the effect of the presentation occurring within a single panel display.

In embodiments, a video display blade 600 may be fabricated, used, installed, and/or manipulated in a similar manner as that for a video display panel slat 400, as described herein.

Figure 8:
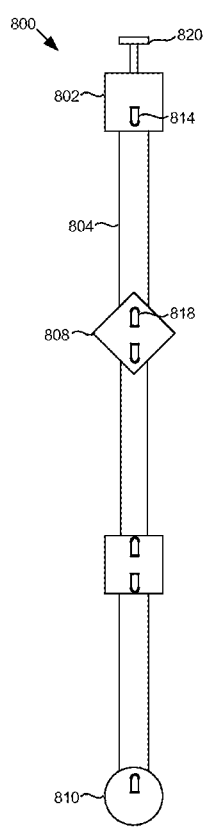
FIG. 8 depicts a simplified schematic of a curtain video display element.

Referring to FIG. 8a, a video display may include a video display curtain element 800 that may include, but is not limited to, a curtain mounting facility 820, LED projection facilities (802, 808, 810), LED's (814, 818), and video display connectors 804. In embodiments, an LED (814, 818) may be mounted within an LED projection facility (802, 808, 810) of a video display curtain element 800 in order to project a video content, or video content portion, upwards 818 or downwards 814 within the curtain element 800. An LED projection facility (802, 808, 810) may be formed into any shape including, but not limited to, a cube 802, a diamond 808, a sphere 810, or some other shape, including without limitation asymmetric shapes and forms. In embodiments, the light emitted from an LED (814, 818) may be directed onto, into, around, or in association with a video display connector 804 that may be attached or associated with one or more LED projection facilities (802, 808, 810). The LED light that is projected onto, into, around, or in association with a video display connector 804 may from a video content or a portion of a video content or other graphic display, including without limitation a static image and/or color. In embodiments, a video display connector 804 may be made of metal, glass, plastic, carbon, or some other material. In embodiments, a video display connector 804 may be made of a material that is associated with a second material in order to enhance its reflectivity. For example, a carbon display connector may be coated with a reflective glaze, a plastic connector may be associated with a mirrored backing and/or an acrylic shading, or some other material combination may be used. In embodiments, a video display connector 804 may include a channel through which a cable may pass, such as a power or data cable.

Figure 9A:
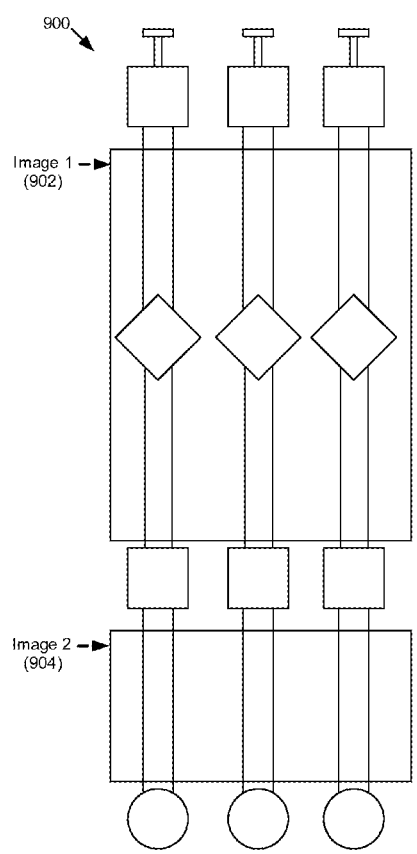
FIG. 9a depicts the presentation of video imagery across a plurality of curtain video display elements.

Referring to FIG. 9a, in embodiments, a plurality of video display curtain elements 900 may be hung in a proximity to one another in a manner permitting a single video image to be displayed across the plurality of curtain elements 900. For example, Image 1 902 that is depicted in FIG. 9a shows a single image that is displayed using the display of a plurality of video display connectors within each curtain element, and a plurality of video display connectors across the curtain elements. In another example, an Image 2 904 may be displayed within the plurality of video display curtain elements 900 using only a single video display connector within each of the plurality of video display curtain elements.

Figure 9B:
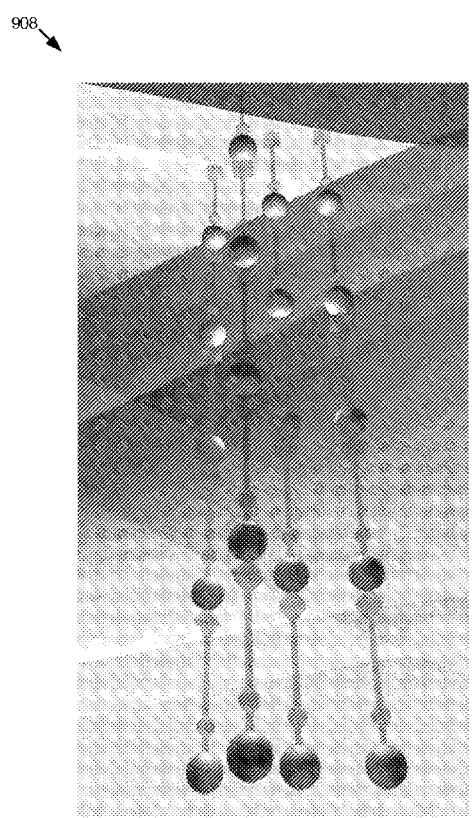
FIG. 9b depicts a simplified schematic of a plurality of curtain video display elements in an installation.

As shown in FIG. 9b, a video display curtain element 908, or plurality of curtain elements 800 may be hung as a chandelier or other suspended lighting feature. Hanging or suspension of a curtain element 800 may be done using a mounting facility 820. In embodiments, a video display curtain element 800, or plurality of curtain elements 800 may form a flexible curtain wall, the shape of an object, or some other three-dimensional form across which video content may be displayed.

In embodiments, a video editing tool (e.g., Flame) may be used to edit a video content for presentation on a three-dimensional surface. In an example, a video editing toot may create and use a video composite in order to calculate a three-dimensional video display that mimics the appearance of a two-dimensional video, so that the distortion resulting from a three-dimensional projection surface (e.g., a sphere) is corrected within the tool (e,g., bending a flat space into polygons) prior to display on the three-dimensional surface. In embodiments, a video editing tool may be used to convert a two-dimensional image for projection onto a three-dimensional video display surface in order to, at least in part, determine the dimensions of the three-dimensional surface to build for presenting the video content.

In embodiments, content may be fed to a slat 400, blade 600, or curtain element 800 in real-time using a camera proximate to the display. For example, a building façade with an LED video display may present live video content of the sky backdrop of the building from cameras mounted on the façade opposite the LED video display side of the building. This may have the effect of making the building "disappear" in that the viewer may see the portion of the sky that is obstructed by the structure of the building (in the form of video content) as if the building did not exist.

In embodiments, video content fed to a slat 400, blade 600, or curtain element 800 may be high definition video content.

In embodiments, lighting systems, video display panels, and similar facilities, including but not limited to LED video display signage, large-scale architectural installation, temporary signage, slat-based signage, blade-based signage, curtain signage, or some other type of video display or lighting method and system, may be powered and or managed by electricity and or data using a power-over-Ethernet/Internet transmission (PoE).

In embodiments, lighting systems, video display panels, and similar facilities, including but not limited to LED video display signage, large-scale architectural installation, temporary signage, slat-based signage, blade-based signage, curtain signage, or some other type of video display or lighting method and system, may be associated with a PoE network that is compliant with an IEEE PoE standard, including, but not limited to, the IEEE 802.3af standard.

In embodiments, lighting systems, video display panels, and similar facilities, including but not limited to LED video display signage, large-scale architectural installation, temporary signage, slat-based signage, blade-based signage, curtain signage, or some other type of video display or lighting method and system, may be associated with a PoE network that is compliant, including backward-compliant, with PoE standards other than IEEE-compliant systems, including preceding standards, rival standards, international standards, or some other PoE transmission methodology or standard capable or transmitting electricity and or data to an LED video display.

In embodiments, lighting systems, video display panels, and similar facilities, including but not limited to LED video display signage, large-scale architectural installation, temporary signage, slat-based signage, blade-based signage, curtain signage, or some other type of video display or lighting method and system, may be associated with PoE power sourcing equipment (PSE). The PSE may be compliant with a PoE standard. The PoE standard may be an IEEE standard, such as the IEEE 802.3af standard, or some other standard, including but not limited to preceding standards, rival standards, international standards, or some other PoE transmission methodology or standard capable or transmitting electricity and or data to an LED video display, as described herein.

In embodiments, lighting systems, video display panels, and similar facilities, including but not limited to LED video display signage, large-scale architectural installation, temporary signage, slat-based signage, blade-based signage, curtain signage, or some other type of video display or lighting method and system, may be a PoE powered device (PD). The PD may be compliant with a PoE standard. The PoE standard may be an IEEE standard, such as the IEEE 802.3af standard, or some other standard, including but not limited to preceding standards, rival standards, international standards, or some other PoE PD methodology or standard capable or transmitting electricity and or data.

In embodiments, a PSE may connect to a network device, including but not limited to a video display or lighting system, as described herein, in order to determine if the device is a PD or not. This may prevent non-PoE enabled equipment from receiving power, which could cause damage. For example, a large scale architectural video display installation may consist of a plurality of video display panels. The video display panels may be powered by a plurality of electric and or data transmission methods, systems, and protocols. A PSE may connect with each network device within the video display installation, including across a video display or lighting installation that includes a plurality of physical/geographic locations (e.g., multiple buildings) in order to determine which of the video display panels is a PD capable of receiving power/data using PoE. In an embodiment, a PSE may apply two small current-limited voltage signals across the cable in order to check for the presence of a characteristic resistance. If resistance is detected, power may be provided to a video display panel (i.e., PD) or lighting system. In embodiments, a PD may also classify how much power it will require from the PSE. For example, one section of a building's video installation or lighting system may use a subset of its PI) to power a dim, low-lighting feature to illuminate a walkway at night, while other of the video display panels and or lights within the same building installation, and powered by the same PSE, may illuminate a brighter, multimedia video content display across a plurality of large video panels. In this example, the PSE may be able to determine that the dim walkway video displays require less power than do the large panels presenting the multimedia content. This may affect the efficiency of the building's video display and or lighting installation.

In embodiments, once a PSE begins to provide power to a PD, it may continuously monitor the PD current draw.

Once the PD current consumption drops below a minimum value, for example when the dim walkway panel illumination described above is no longer needed after sunrise, the PSE may discontinue supplying power and the discovery process may begin again.

In embodiments, lighting systems, video display panels, and similar facilities, including but not limited to LED video display signage, large-scale architectural installation, temporary signage, slat-based signage, blade-based signage, curtain signage, or some other type of video display or lighting method and system, may be associated with a PoE powered device (PD) other than a video display or lighting system. In embodiments, the PD other than a video display panel may be further associated with a video display panel PD. The PD may be compliant with a PoE standard. The PoE standard may be an IEEE standard, such as the IEEE 802.3af standard, or some other standard, including but not limited to preceding standards, rival standards, international standards, or some other PoE transmission methodology or standard capable or transmitting electricity and or data. For example, a user interface, such as a user interface capable of operating a video editing software (e.g., Flame) may be a PD. This user interface PD may be further associated with video display PD's and or video displays that are not PD's. In embodiments, the user interface PD may enable a management control functionality that permits intelligent control and manipulation of all of an installation's lighting systems.

In embodiments, lighting units, including LED's, may be associated with intelligent management systems that may, for example, mix color LED's with white LED's and use sensors to match an environment (e.g., matching the color temperature of the outside light throughout the day). In embodiments, a management system may be operated using a desktop computer, or some other device (e.g., mobile communication facility, PDA, etc.). In an example, each office within a building or installation may have control over its lighting through the use of a management user interface (e.g., Internet-driven/IP driven) in order to independently design the lighting for each office area. Such a management system may be powered in whole, or in part, by a PoE system, as described herein.

In embodiments, a PoE PSE that is associated with an LED video display panel, plurality of panels, lighting system, or plurality of lighting systems may be an endspan PSE or a midspan PSE. An endspan PSE may integrate a power sourcing functionality with a network switch. Endspans may function in a manner similar to an Ethernet switch, except they may provide PoE in addition to routing data. Since Ethernet data pairs may use transformers coupled at each end of the link, DC power may be added to a center tap of a transformer without disrupting the data. In this mode of operation, an endspan may inject both power and data on pin-pairs 3 and 6 and pin-pairs 1 and 2, or some other PoE compliant receiver. A midspan PSE may be located in between a switch and a PD. It may supply power over unused cable pin-pairs 4 and 5 and pin-pairs 7 and 8. Data may be routed through the midspan device without modification. A PD, such as a video display PD, may have the capability to accept power from both an endspan PSE and a midspan PSE.

In embodiments, lighting systems, video display panels, and similar facilities, including but not limited to LED video display signage, large-scale architectural installation, temporary signage, slat-based signage, blade-based signage, curtain signage, or some other type of video display or lighting method and system, may be associated with a powered patch panel (PPP). A PPP may combine the functionality of a midspan device with a conventional patch panel. By using a powered patch panel, a switch may connect directly to a PD, such as an LED video display panel, through the PPP. A patch cord may connect the switch to the front of the PPP while the PD is connected to the back of the panel on the matching punch down terminal. Power may be added to unused data pin-pairs within the patch panel. Using a PPP may require fewer ports, fewer patch cords and less rack space compared to power midspans.

In embodiments, a power source may be located in the central core of a building. A power source may a current, such as 36V. In embodiments, each pixel in a video display or lighting installation may be associated with a DC-to-DC converter. A DC-to-DC converter may be enabled to convert a power transmission, such as a 36V transmission, to a different voltage conforming to the requirements and or capabilities of a given pixel (e.g., 5V, 5 amps, or some other power level). The DC-to-DC converter may reduce or eliminate the need for calibrating at the power source.

In embodiments, a video display and or lighting system may be powered by a PoE system transmitting power at 30 W, 60 W, 70 W, or some other power level.

Figure 10:
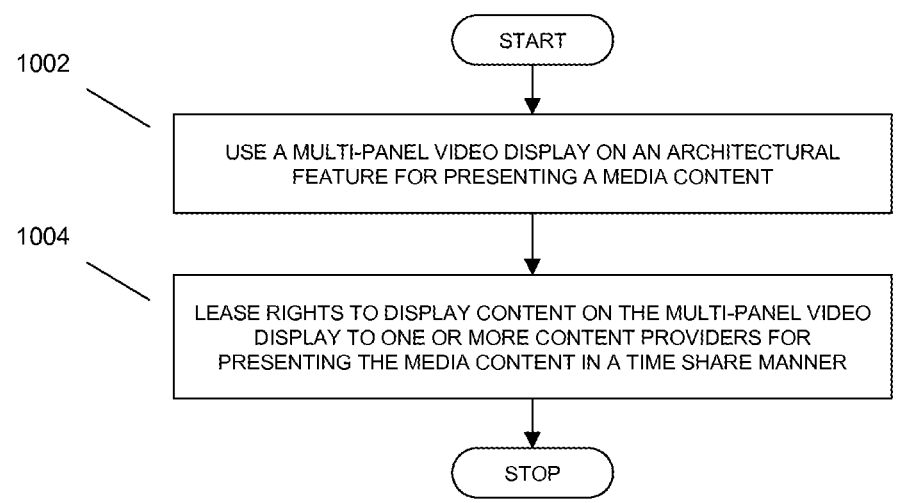
FIG. 10 depicts a generalized method for leasing rights to display content on the multi-panel video display to one or more content providers for presenting the media content in a time share manner.

Referring to FIG. 10, in embodiments, a multi-panel video display may be used on an architectural feature for presenting a media content 1002. Rights may be leased, in a time share manner, to one or more content providers to display content on the multi-panel video display 1004. The leasing rights may include the rights to provide advertising content, or some other type of content.

In embodiments, a content provider may be an advertiser.

In embodiments, the multi-panel video display may be coordinated across panels within the display to present a unified content that spans the multi-panel video display, associated with a software editor for managing the presentation of the content, associated with at least one power cable associated with at least one data cable. A data cable may be an Ethernet cable, and the like.

In embodiments, a power cable may be an Ethernet cable.

In embodiments, the multi-panel video display may be associated with at least one data cable.

In embodiments, the data cable may be an Ethernet cable.

In embodiments, the architectural feature may be a building façade, a plurality of building façades, an internal building feature, a wall, a gable, a cornice, a sign, a temporary architectural feature, and the like.

In embodiments, the media content may be an image, a sound, a video, multi-media content, and the like.

In embodiments, a term of the lease of the multi-panel video display may be a based at least in part on a prospective lessee's bid received within a bidding platform.

In embodiments, the bidding platform may include a listing of an attribute of the display, where the attribute may be selected from the group consisting the size of the display, historical revenues associated with the display, the density of the population in proximity to the display, the distance from which the display can be viewed, or the traffic within a viewing distance of the display, and the like.

In embodiments, the multi-panel video display may be associated with at least one power cable.

In embodiments, the power cable may be an Ethernet cable.

In embodiments, the multi-panel video display may be associated with at least one data cable.

In embodiments, the data cable may be an Ethernet cable.

Figure 11:
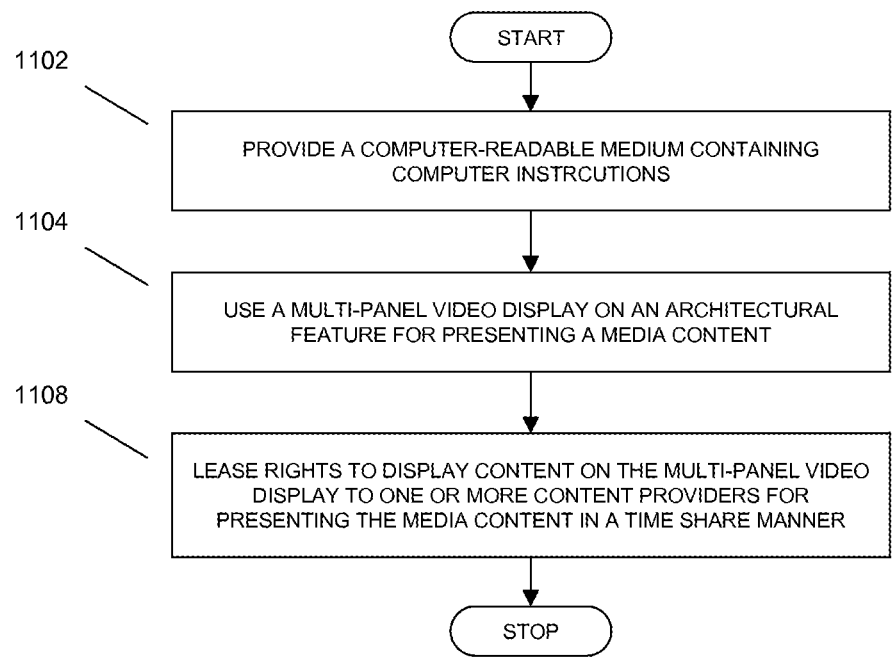
FIG. 11 depicts a generalized system for leasing rights to display content on the multi-panel video display to one or more content providers for presenting the media content in a time share manner.

Referring to FIG. 11, in embodiments, a computer-readable medium containing computer instructions 1102 may be provided. A multi-panel video display may be used on an architectural feature for presenting a media content 1104; and rights may be leased to display content on the multi-panel video display to one or more content providers for presenting the media content in a time share manner 1108. In embodiments, leasing the rights may include leasing rights to provide advertising content. In embodiments, the multi-panel video display may be coordinated across panels within the display to present a unified content that spans the multi-panel video display. In embodiments, the multi-panel video display may be associated with a software editor for managing the presentation of the content. In embodiments, the multi-panel video display may be associated with at least one power cable. In embodiments, the power cable may be an Ethernet cable. In embodiments, the multi-panel video display may be associated with at least one data cable. In embodiments, the data cable may be an Ethernet cable.

Figure 12:
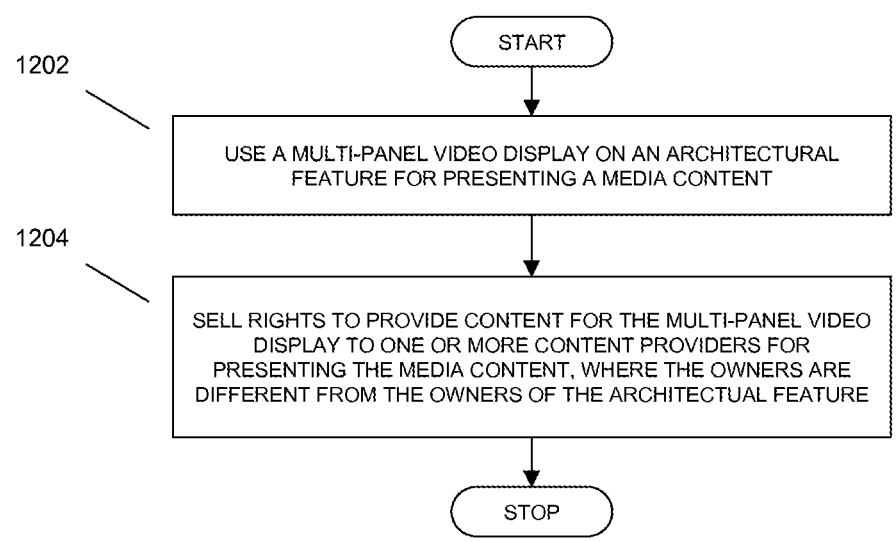
FIG. 12 depicts a generalized method for selling rights to provide content for the multi-panel video display to one or more content providers for presenting the media content, the content owners being different from the owners of the architectural feature.

Referring to FIG. 12, in embodiments, a multi-panel video display may be used on an architectural feature for presenting media content 1202. Rights may be sold to provide content for the multi-panel video display to one or more content providers for presenting the media content, where the content owners may be different from the owners of the architectural feature 1204.

Figure 13:
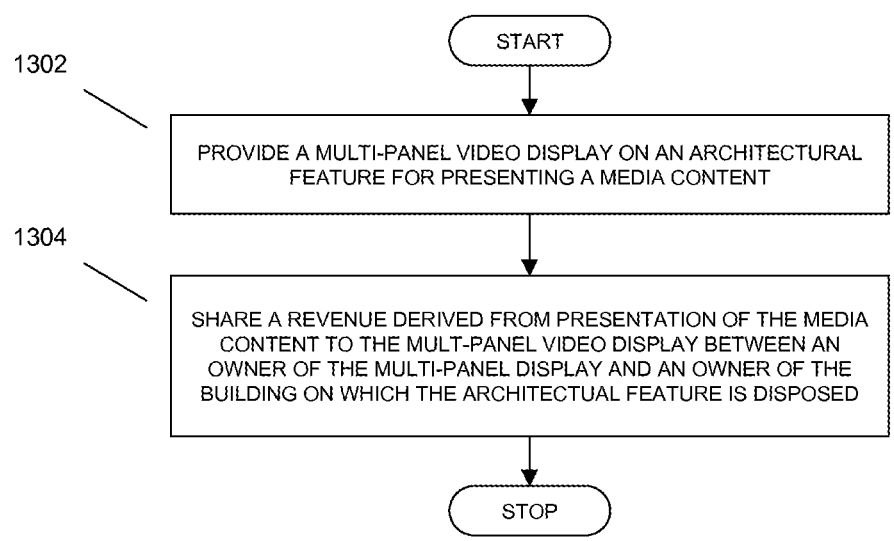
FIG. 13 depicts a generalized method for sharing a revenue derived from presentation of the media content to the multi-panel video display between an owner of the multi-panel display and an owner of the building on which the architectural feature is disposed.

Referring to FIG. 13, in embodiments, a multi-panel video display may be provided on an architectural feature for presenting media content 1302. A revenue may be shared derived from presentation of the media content to the multi-panel video display between an owner of the multi-panel display and an owner of the building on which the architectural feature may be disposed 1304. In embodiments, sharing the revenue derived from presentation of the content to the multi-panel video display may be between an owner of the multi-panel display, an owner of the architectural feature, an owner of the content, and the in embodiments, the revenue may be based at least in part on a pay-per-view content, pay-per-predicted view of content, size of the multi-panel video display, population density within a vicinity of the multi-panel video display, number of visitors to the vicinity of the multi-panel video display, and the like.

Figure 14:
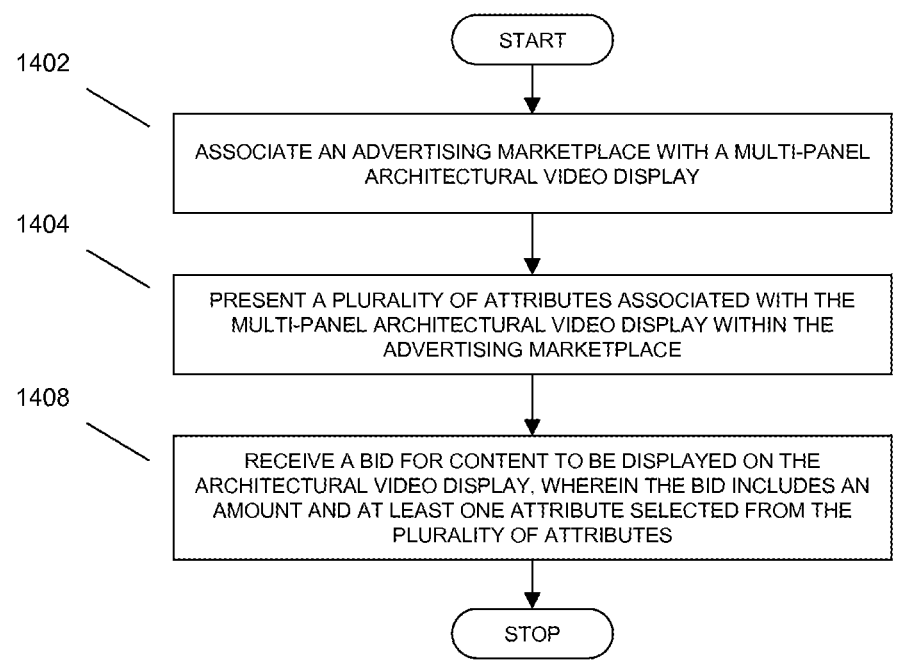
FIG. 14 depicts a generalized method for associating an advertising marketplace with a multi-panel architectural video display.

Referring to FIG. 14, in embodiments, an advertising marketplace may be associated with a multi-panel architectural video display 1402. A plurality of attributes may be presented that may be associated with the multi-panel architectural video display within the advertising marketplace 1404. A bid for content may be received to be displayed on the architectural video display, wherein the bid includes an amount and at least one attribute selected from the plurality of attributes 1408. In embodiments, the attribute may be display size, a time of content presentation, a location of content presentation, duration of content presentation, a frequency of content presentation, an environmental factor associated with the display, an environmental factor associated with population density within a vicinity of the display, an environmental factor associated with a number of visitors within a vicinity of the display, and the like.

Figure 15:
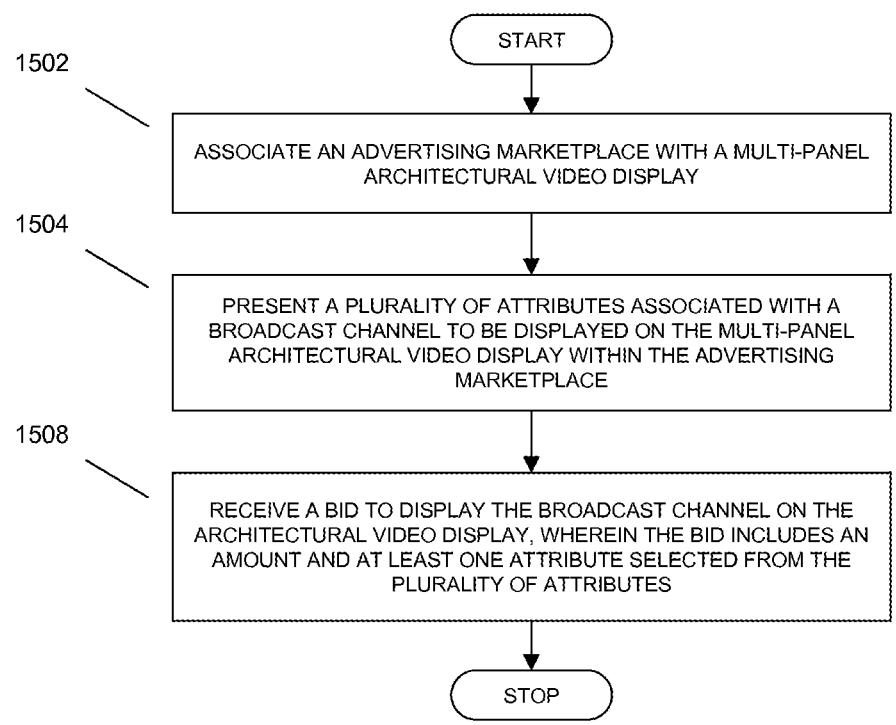
FIG. 15 depicts a generalized method for a bidding advertising marketplace for placing a broadcast channel on a multi-panel architectural video display.

Referring to FIG. 15, in embodiments, an advertising marketplace may be associated with a multi-panel architectural video display 1502. A plurality of attributes associated with a broadcast channel may be presented to be displayed on the architectural video display within the advertising marketplace 1504. A bid may be received to display the broadcast channel on the architectural video display, wherein the bid includes an amount and at least one attribute selected from the plurality of attributes 1508. In embodiments, the broadcast channel may be associated with an owner of the architecture associated with the architectural video display.

Figure 16:
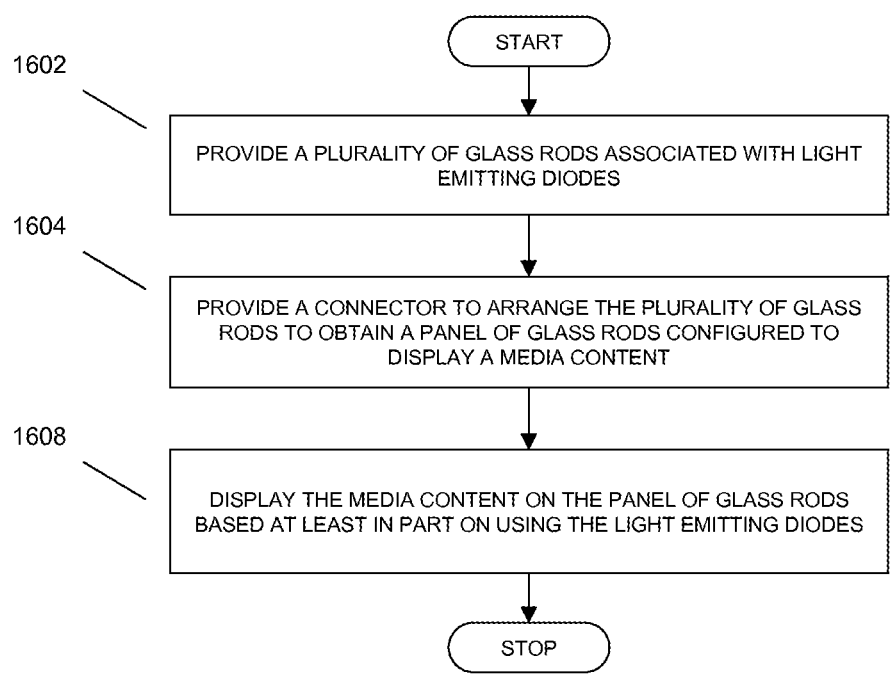
FIG. 16 depicts a generalized method for using glass rods to display media content.

Referring to FIG. 16, in embodiments, a plurality of glass rods may be provided associated with light emitting diodes 1602. A connector may be provided to arrange the plurality of glass rods to obtain a panel of glass rods configured to display a media content 1604, and the media content may be displayed on the panel of glass rods based at least in part on using the light emitting diodes 1608. In embodiments, associating the panel of glass rods may be associated with an architectural element. In embodiments, the connector may be associated with at least one power cable. In embodiments, the power cable may be an Ethernet cable, where the connector may be associated with at least one data cable. In embodiments, the data cable may be an Ethernet cable. In embodiments, the display may be coordinated across the plurality of glass rods within the panel of glass rods to present a unified content that spans the plurality of glass rods. In embodiments, the display may be associated with a software editor for managing the presentation of the media content.

Figure 17:
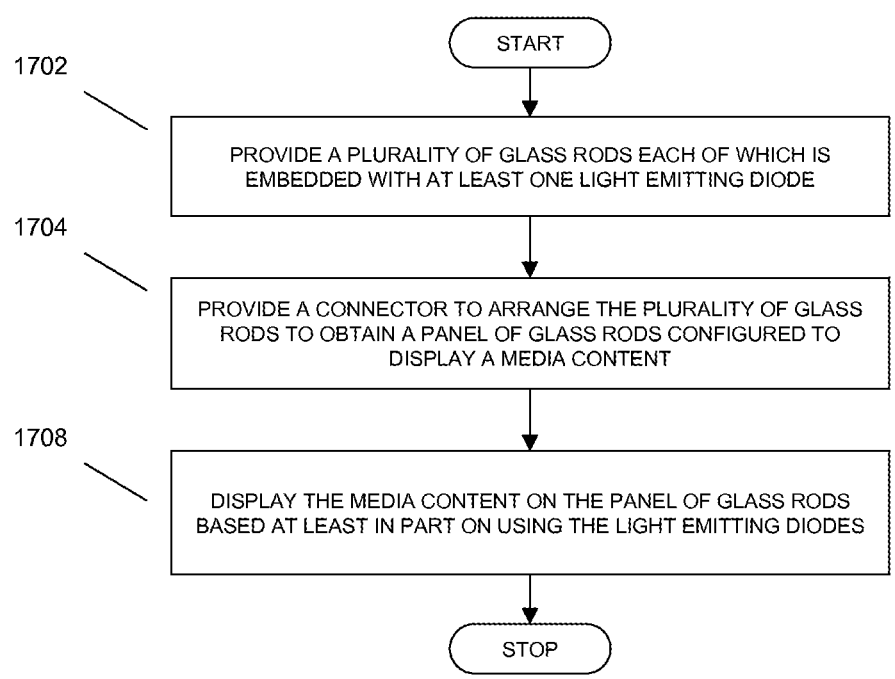
FIG. 17 depicts a generalized method for using glass rods to form a panel on which to display media content.

Referring to FIG. 17, in embodiments, a plurality of glass rods may be provided, each of which may be embedded with at least one light emitting diode 1702. A connector may be provided to arrange the plurality of glass rods to obtain a panel of glass rods configured to display a media content 1704. The media content may be displayed on the panel of glass rods based at least in part on using the light emitting diodes 1708. In embodiments, the panel of glass rods may be associated with an architectural element. In embodiments, the connector may be associated with at least one power cable. In embodiments, the power cable may be an Ethernet cable. In embodiments, the connector may be associated with at least one data cable. In embodiments, the data cable may be an Ethernet cable.

Figure 18:
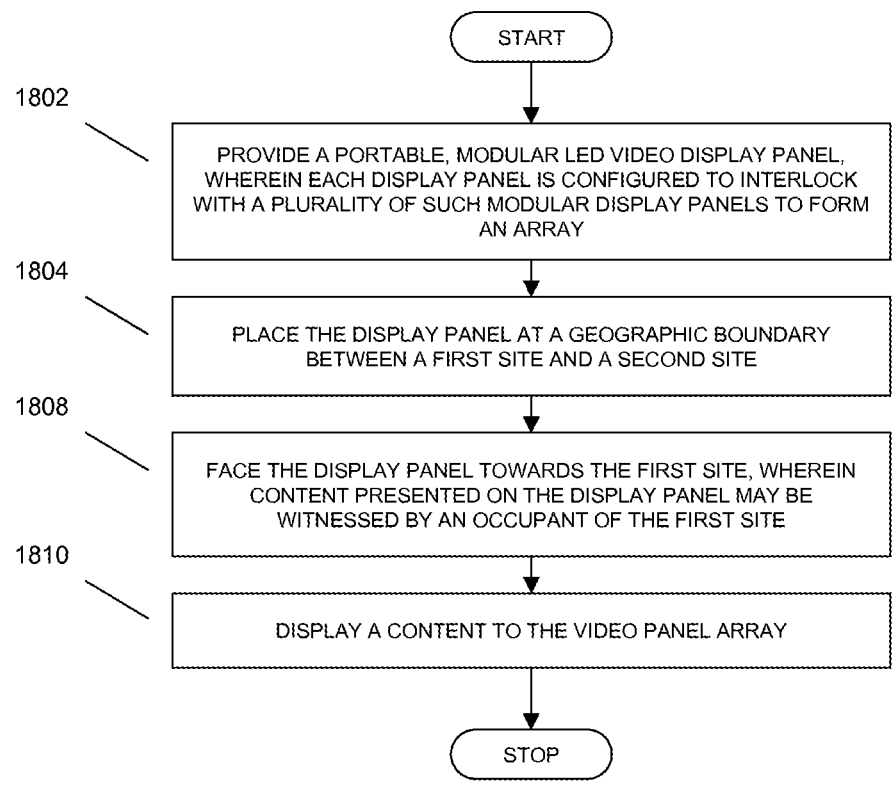
FIG. 18 depicts a generalized method for using portable, modular LED video display panels to form a barrier between two locations.

Referring to FIG. 18, in embodiments, a portable, modular LED video display panel may be provided, wherein each display panel may be configured to interlock with a plurality of such modular display panels to form an array 1802. The display panel may be placed at a geographic boundary between a first site and a second site 1804. Facing the display panel may face towards the first site, where content presented on the display panel may be witnessed by an occupant of the first site 1808. A content to the video panel array 1810 may be displayed. In embodiments, the site may be a construction site and the array may be configured as part of a temporary boundary for the construction site, an event site and the array may be configured as part of a temporary boundary for the event site, and the like. In embodiments, the display may be coordinated across panels within the display to present a unified content that spans the multi-panel video display. In embodiments, the multi-panel video display may be associated with a software editor for managing the presentation of the content. In embodiments, the display panel may be a multi-sided display panel, where the multi-sided display panel may be a two-sided display panel. In embodiments, the geographic boundary may be a temporary boundary, a portable boundary, a transportable boundary, and the like. In embodiments, the first site may be a geographic location adjacent to a construction site. In embodiments, the second site may be a construction site. In embodiments, the video panel array may be associated with at least one power cable, where the power cable may be an Ethernet cable. In embodiments, the video panel array may be associated with at least one data cable, where the data cable may be an Ethernet cable.

Figure 19:
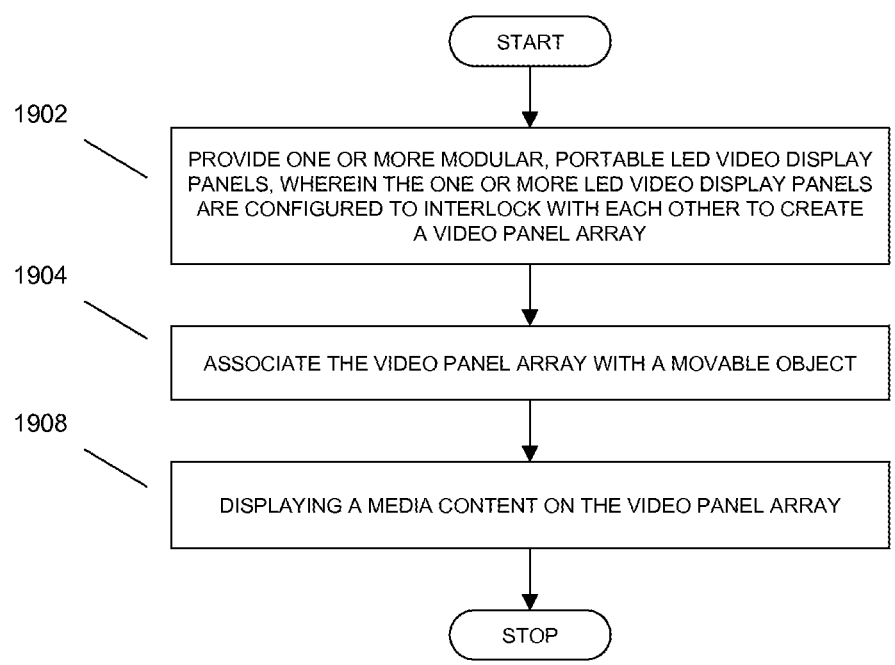
FIG. 19 depicts a generalized method for using portable, modular LED video display panels in association with a movable object.

Referring to FIG. 19, in embodiments, one or more modular, portable LED video display panels may be provided, where the one or more LED video display panels may be configured to interlock with each other to create a video panel array 1901 The video panel array may be associated with a movable object 1904. A media content may be displayed on the video panel array 1908. In embodiments, the video panel array may be associated with at least one power cable, where the power cable may be an Ethernet cable. In embodiments, the video panel array may be associated with at least one data cable, where the data cable may be an Ethernet cable.

Figure 20:
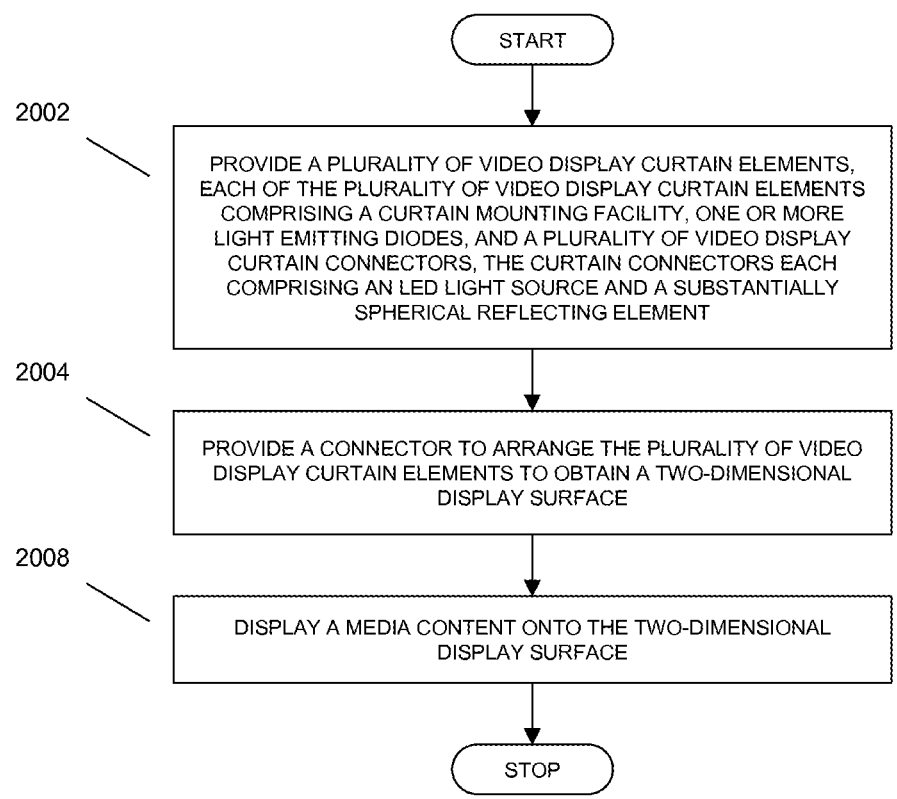
FIG. 20 depicts a generalized method for using a plurality of video display curtain elements to display a media content.

Referring to FIG. 20, in embodiments, a plurality of video display curtain elements may be provided, each of the plurality of video display curtain elements may include a curtain mounting facility, one or more light emitting diodes, a plurality of video display curtain connectors, and the like, where the curtain connectors each may include an LED light source, a substantially spherical reflecting element 2002, and the like. A connector may be provided to arrange the plurality of video display curtain elements to obtain a two-dimensional display surface 2004. In addition, a media content may be displayed onto the two-dimensional display surface 2008. In embodiments, the connector may be associated with at least one power cable, where the power cable may be an Ethernet cable. In embodiments, the connector may be associated with at least one data cable, where the data cable may be an Ethernet cable.

Figure 21:
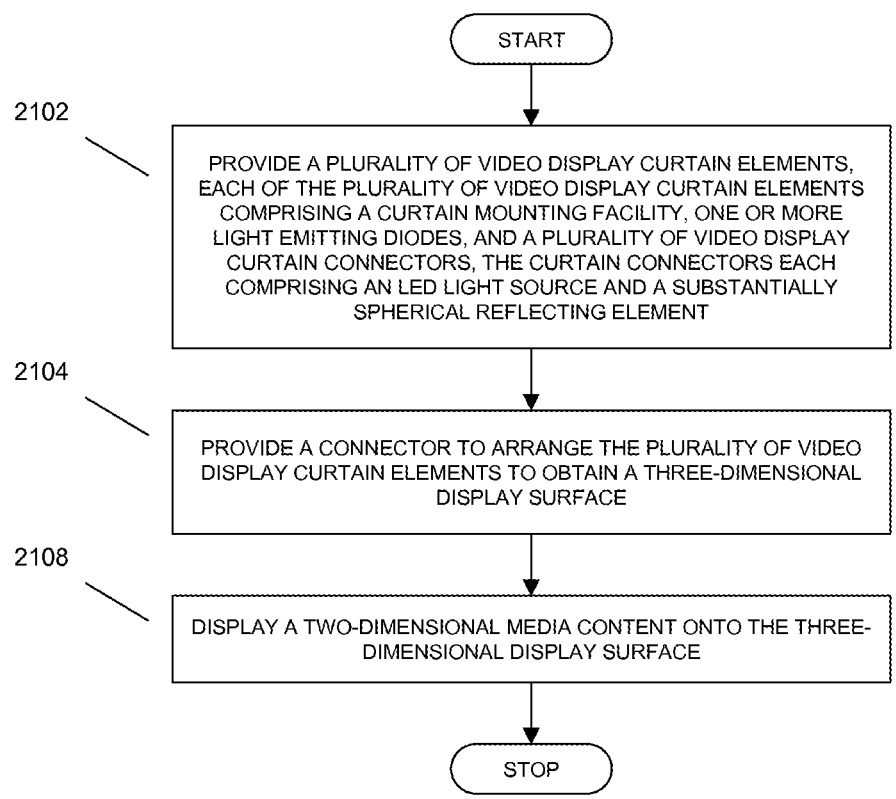
FIG. 21 depicts a generalized method for using a plurality of video display curtain elements to display a two-dimensional media content on a three-dimensional display surface.

Referring to FIG. 21, in embodiments, a plurality of video display curtain elements may be provided, including each of the plurality of video display curtain elements comprising a curtain mounting facility, one or more light emitting diodes, a plurality of video display curtain connectors, and the like, where the curtain connectors may each include an LED light source and a substantially spherical reflecting element 2102. A connector may be provided to arrange the plurality of video display curtain elements to obtain a three-dimensional display surface 2104, where two-dimensional media content may be displayed onto the three-dimensional display surface 2108. In embodiments, the connector may be associated with at least one power cable, where the power cable may be an Ethernet cable. In embodiments, the connector may be associated with at least one data cable, where the data cable may be an Ethernet cable.

Figure 22:
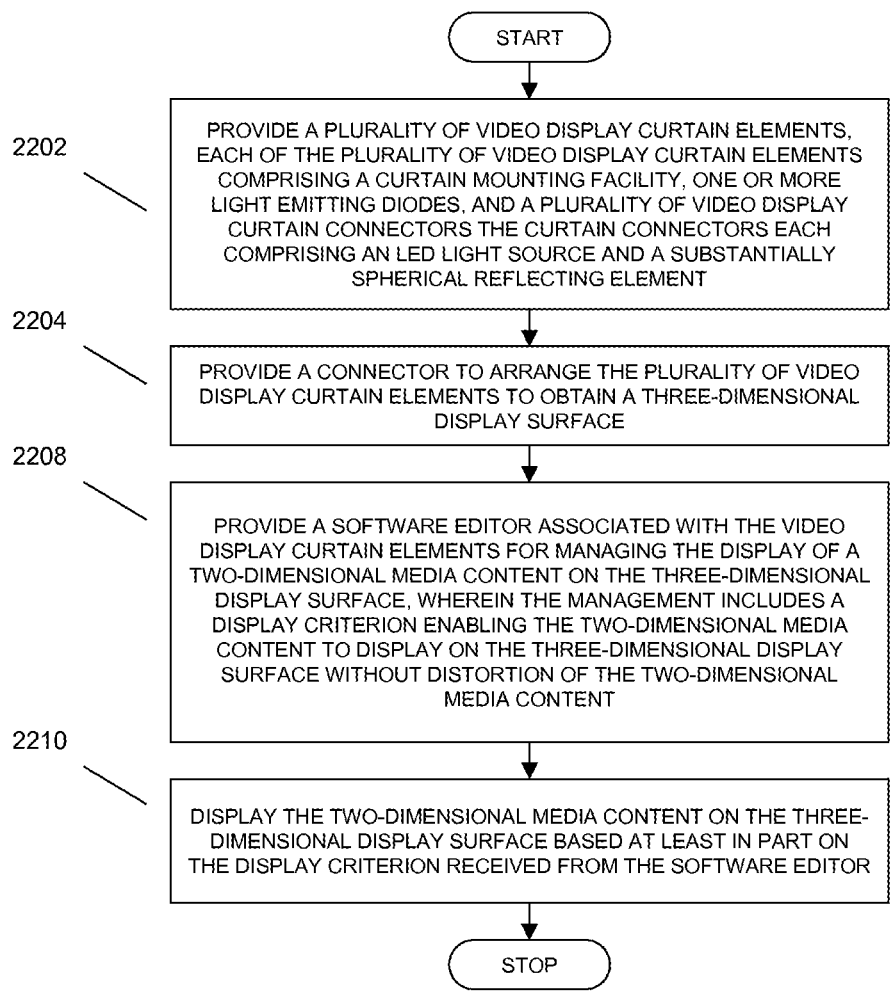
FIG. 22 depicts a generalized method for using a software media editor in association with a plurality of video display curtain elements to display a two-dimensional media content on a three-dimensional display surface.

Referring to FIG. 22, in embodiments, a plurality of video display curtain elements may be provided, each of the plurality of video display curtain elements including a curtain mounting facility, one or more light emitting diodes, a plurality of video display curtain connectors, and the like, where the curtain connectors may each include an LED light source, a substantially spherical reflecting element and the like 2202. A connector to arrange the plurality of video display curtain elements may be provided to obtain a three-dimensional display surface 2204. A software editor associated with the video display curtain elements may be provided for managing the display of a two-dimensional media content on the three-dimensional display surface, where the management may include a display criterion enabling the two-dimensional media content to display on the three-dimensional display surface without distortion of the two-dimensional media content 2208. The two-dimensional media content may be displayed on the three-dimensional display surface based at least in part on the display criterion received from the software editor 2210. In embodiments, the connector may be associated with at least one power cable, where the power cable may be an Ethernet cable. In embodiments, the connector may be associated with at least one data cable, where the data cable may be an Ethernet cable.

Figure 23:
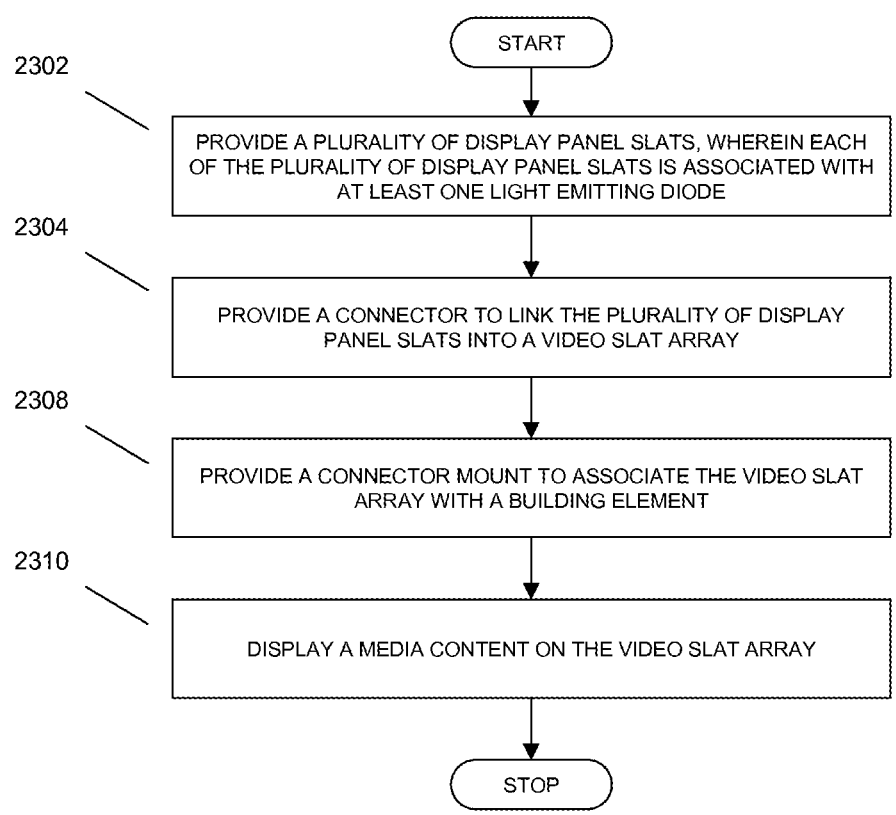
FIG. 23 depicts a generalized method for using video display panel slats.

Referring to FIG. 23, in embodiments, a plurality of display panel slats may be provided, where each of the plurality of display panel slats may be associated with at least one light emitting diode 2302. A connector to link the plurality of display panel slats into a video slat array 2304 may be provided. A connector mount may be provided to associate the video slat array with a building element 2308. In addition, a media content may be displayed on the video slat array 2310. In embodiments, the connector may be associated with at least one power cable, where the power cable may be an Ethernet cable. In embodiments, the connector may be associated with at least one data cable, where the data cable may be an Ethernet cable.

Figure 24:
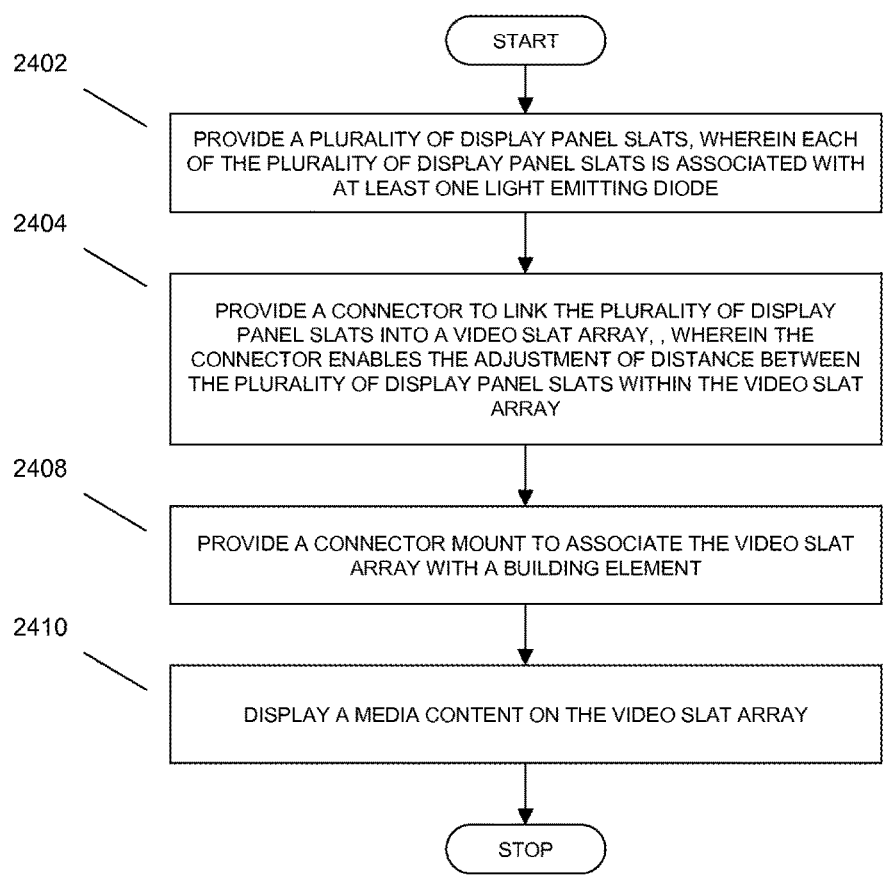
FIG. 24 depicts a generalized method for using adjustable video display panel slats.

Referring to FIG. 24, in embodiments, a plurality of display panel slats may be provided, where each of the plurality of display panel slats may be associated with at least one light emitting diode 2402. A connector to link the plurality of display panel slats into a video slat array may be provided, where the connector may enable the adjustment of distance between the plurality of display panel slats within the video slat array 2404. A connector mount may be provided to associate the video slat array with a building element 2408. In addition, a media content may be displayed on the video slat array 2410. In embodiments, the video slat array may be associated with an audio system, a cooling system, and the like. In embodiments, the adjustment of the distance between the plurality of display panel slats with the video slat array may be made by sliding at least one display panel slat in association with the connector, by pivoting at least one display panel slat in association with the connector, and the like. In embodiments, the connector may be associated with at least one power cable, where the power cable may be an Ethernet cable. In embodiments, the connector may be associated with at least one data cable, where the data cable may be an Ethernet cable.

Figure 25:
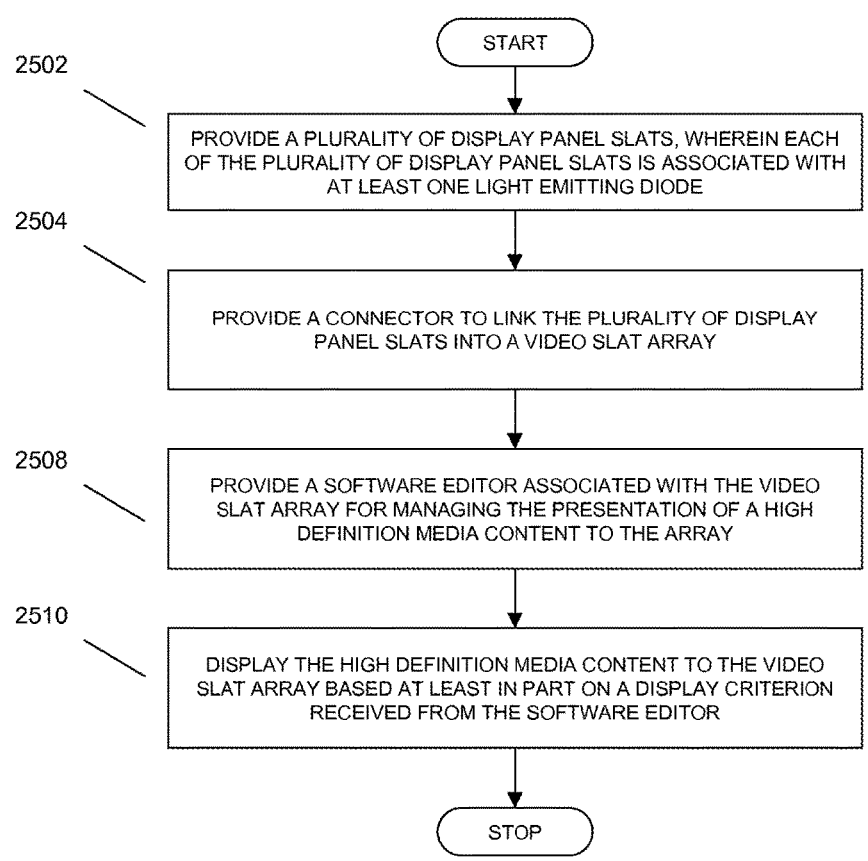
FIG. 25 depicts a generalized method for using a software media editor in association with a plurality of video display panel slats.

Referring to FIG. 25, in embodiments, a plurality of display panel slats may be provided, where each of the plurality of display panel slats may be associated with at least one light emitting diode 2502. A connector may be provided to link the plurality of display panel slats into a video slat array 2504. A software editor associated with the video slat array may be provided for managing the presentation of a high definition media content to the array 2508. The high definition media content may be displayed to the video slat array and may be based at least in part on a display criterion received from the software editor 2510. In embodiments, the connector may be associated with at least one power cable, where the power cable may be an Ethernet cable. In embodiments, the connector may be associated with at least one data cable, where the data cable may be an Ethernet cable.

Figure 26:
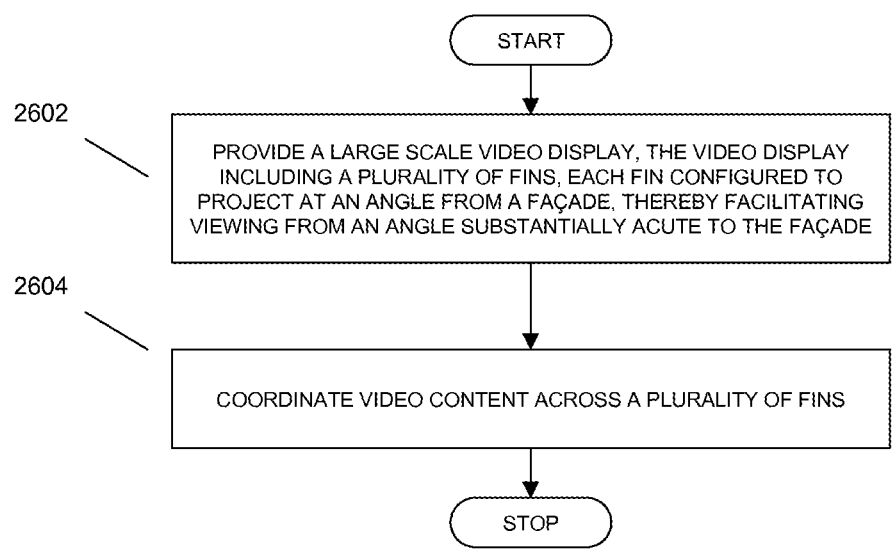
FIG. 26 depicts a generalized method for using video display panel fins.

Referring to FIG. 26, in embodiments, a large scale video display may be provided, where the video display may include a plurality of fins where each fin may be configured to project at an angle from a façade, which may facilitate viewing from an angle substantially acute to the façade 2602. In addition, video content may be coordinated across a plurality of fins 2604. In embodiments, the fins may be rotatably disposed on the façade, thereby allowing the fins to project at different angles from the façade. In embodiments, coordinated video content may be provided for the fins and for a video display disposed flat on the façade. In embodiments, a video display may be provided on a face and on an edge of each of the plurality of fins. In embodiments, the video display may be coordinated across each of the faces and each of the edges among the plurality of fins. In embodiments, the video display may include a first media content on at least one face and a second media content on at least one edge. In embodiments, the video display may be alternated between the face and the edge of each of the plurality of fins. In embodiments, the plurality of fins may be associated with an audio system, with a cooling system, and the like. In embodiments, the video content may be high definition video content. In embodiments, the large scale video display may be associated with a software editor for managing the presentation of the content. In embodiments, the connector may be associated with at least one power cable, where the power cable may be an Ethernet cable. In embodiments, the connector may be associated with at least one data cable, where the data cable may be an Ethernet cable.

Figure 27:
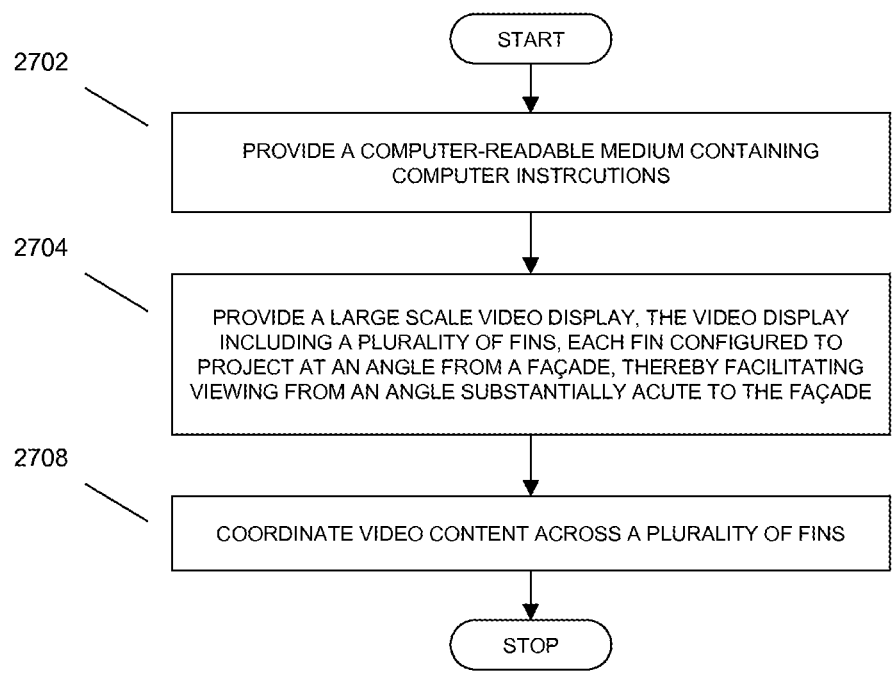
FIG. 27 depicts a generalized system for using video display panel fins

Referring to FIG. 27, in embodiments, a computer-readable medium containing computer instructions 2702 may be provided, which may include a large scale video display. The video display may include a plurality of fins, where each fin may be configured to project at an angle from a façade, thereby facilitating viewing from an angle substantially acute to the façade 2704. In addition, video content may be coordinated across a plurality of fins 2708. In embodiments, the fins may be rotatably disposed on the façade, thereby allowing the fins to project at different angles from the façade. In embodiments, coordinated video content may be provided for the fins and for a video display disposed flat on the façade. In embodiments, a video display may be provided on a face and on an edge of each of the plurality of fins.

Figure 28:
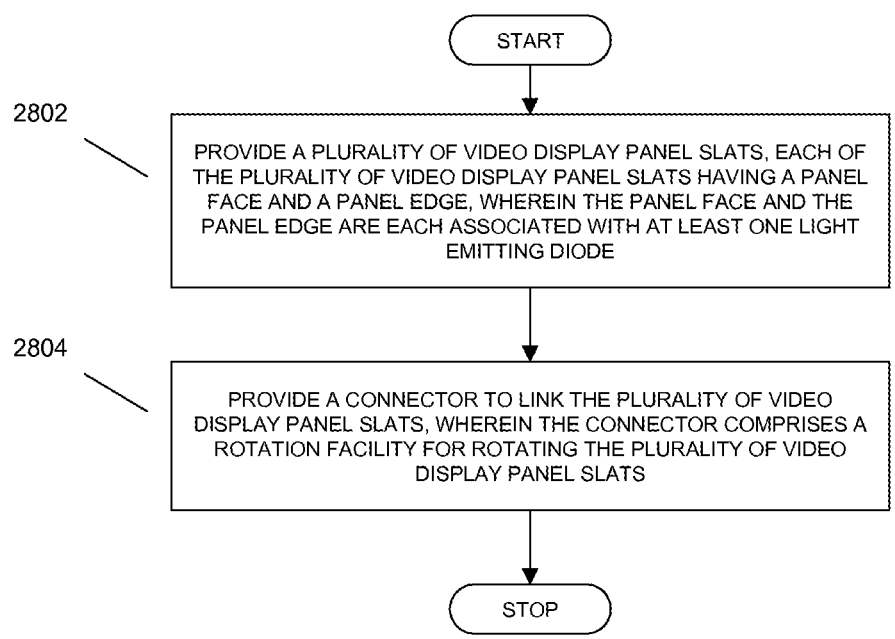
FIG. 28 depicts a generalized method for display media along a face and an edge of a video display panel slat.

Referring to FIG. 28, in embodiments, a plurality of video display panel slats may be provided. Each of the plurality of video display panel slats may have a panel face and a panel edge, wherein the panel face and the panel edge may be each associated with at least one light emitting diode 2802. A connector to link the plurality of video display panel slats may be provided, wherein the connector comprises a rotation facility for rotating the plurality of video display panel slats 2804. In embodiments, the connector may be associated with at least one power cable, where the power cable may be an Ethernet cable. In embodiments, the connector may be associated with at least one data cable, where the data cable may be an Ethernet cable.

Figure 29:
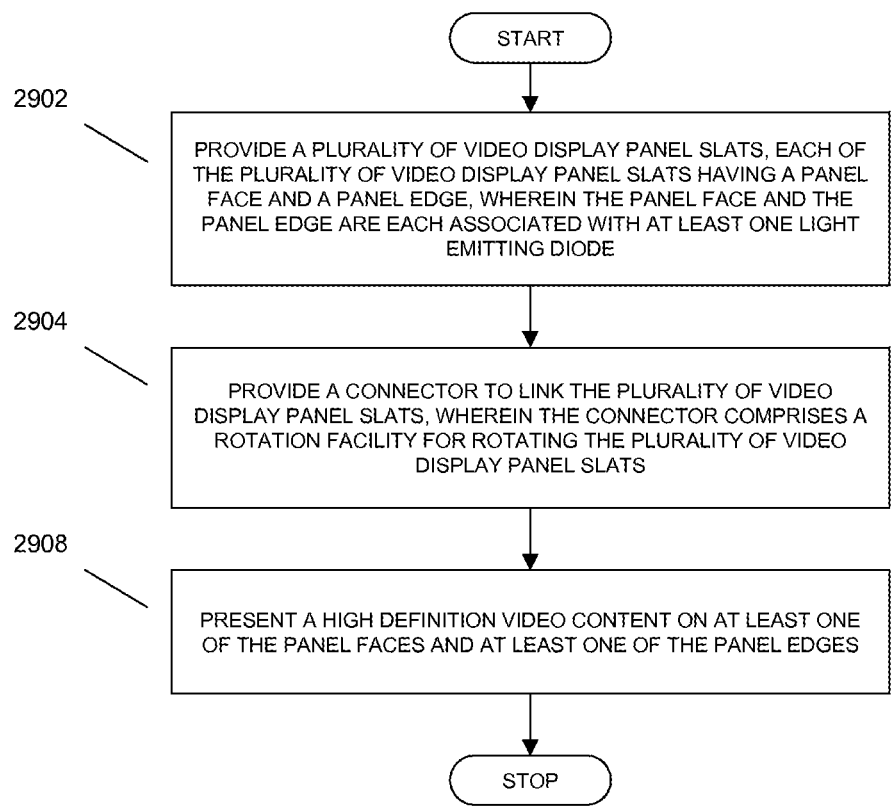
FIG. 29 depicts a generalized method for presenting high definition video content to a plurality of video display panel slats, each of which may be rotated.

Referring to FIG. 29, in embodiments, a plurality of video display panel slats may be provided. Each of the plurality of video display panel slats may have a panel face and a panel edge, wherein the panel face and the panel edge may each be associated with at least one light emitting diode 2902. A connector to link the plurality of video display panel slats may be provided, wherein the connector may include a rotation facility for rotating the plurality of video display panel slats 2904. In addition, a high definition video content may be provided on at least one of the panel faces and at least one of the panel edges 2908. In embodiments, the display between the panel face and the panel edge may be temporally alternated. In embodiments, a first media content may be displayed on at least one panel face and a second media content on at least one panel edge. In embodiments, the display of the content across each of the panel faces and each of the panel edges may be coordinated. In embodiments, the connector may be associated with at least one power cable, where the power cable may be an Ethernet cable. In embodiments, the connector may be associated with at least one data cable, where the data cable may be an Ethernet cable.

Figure 30:
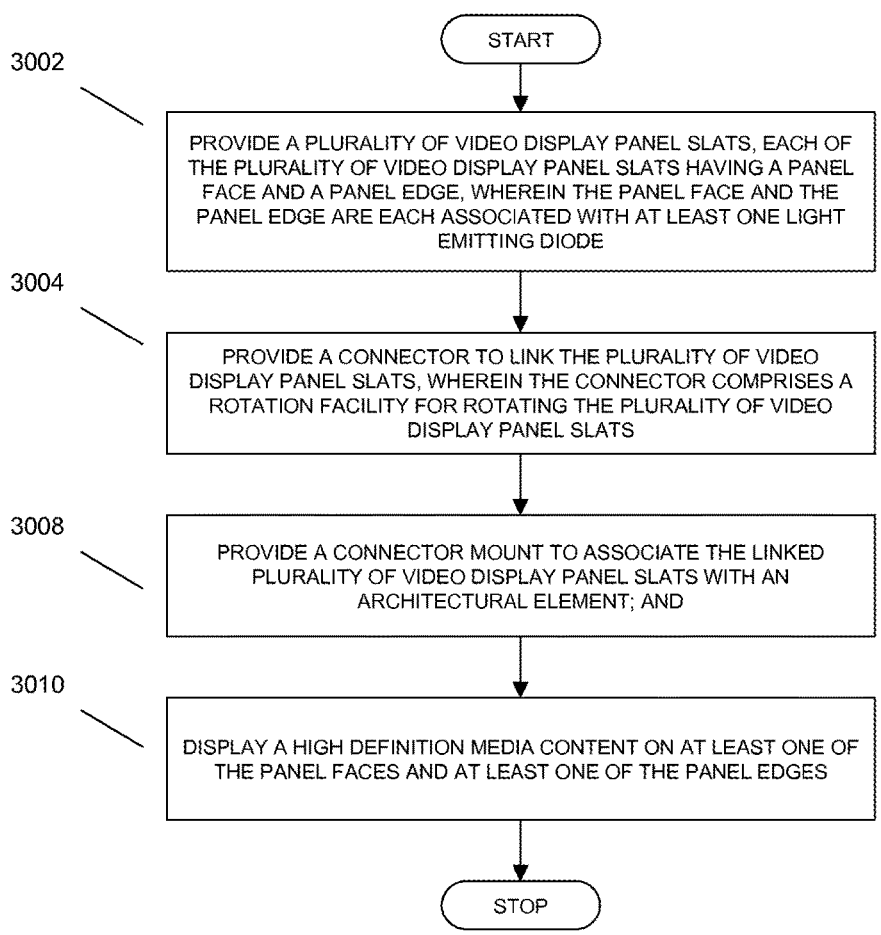
FIG. 30 depicts a generalized method for presenting high definition video content to a plurality of video display panel slats that are associated with an architectural feature, each of which may be rotated.

Referring to FIG. 30, in embodiments, a plurality of video display panel slats may be provided, each of the plurality of video display panel slats having a panel face and a panel edge, wherein the panel face and the panel edge may each be associated with at least one light emitting diode 3002. A connector to link the plurality of video display panel slats may be provided, wherein the connector comprises a rotation facility for rotating the plurality of video display panel slats 3004. A connector mount to associate the linked plurality of video display panel slats with an architectural element 3008 may be provided. A high definition media content may be displayed on at least one of the panel faces and at least one of the panel edges 3010. In embodiments, the display between the panel face and the panel edge may be temporally alternated. In embodiments, a first media content may be displayed on at least one panel face and a second media content on at least one panel edge. In embodiments, the display of the content across each of the panel faces and each of the panel edges may be coordinated. In embodiments, the connector may be associated with at least one power cable, where the power cable may be an Ethernet cable. In embodiments, the connector may be associated with at least one data cable, where the data cable may be an Ethernet cable.

Figure 31:
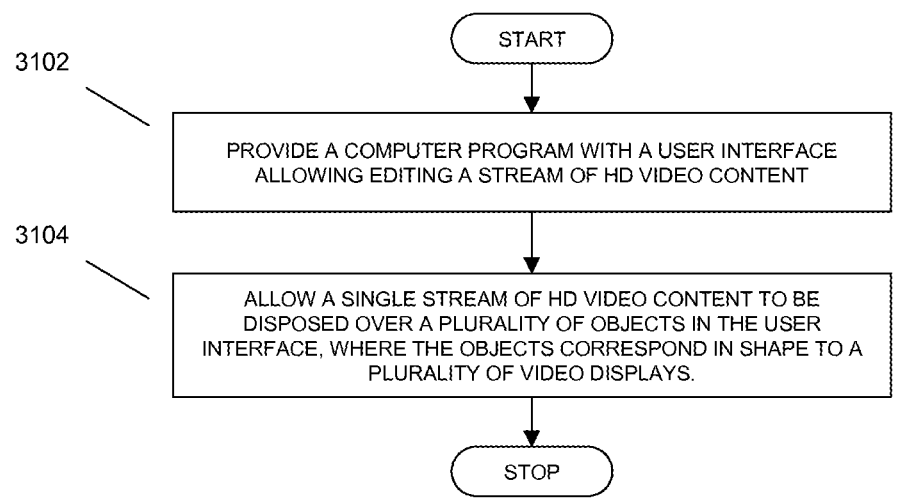
FIG. 31 depicts a generalized method for editing a single stream of video content for display over a plurality of objects.

Referring to FIG. 31, in embodiments, a computer program may be provided with a user interface allowing editing a stream of HD video content 3102. In the user interface, allowing a single stream of HD video content may be allowed to be disposed over a plurality of objects, where the Objects may correspond in shape to a plurality of video displays 3104. In embodiments, taking the edited stream of HD video content may be taken and configured for display on a plurality of video displays corresponding to the objects in the user interface. In embodiments, editing the HD video content may include video encoding, video conversion, non-linear video editing, and the like.

Figure 32:
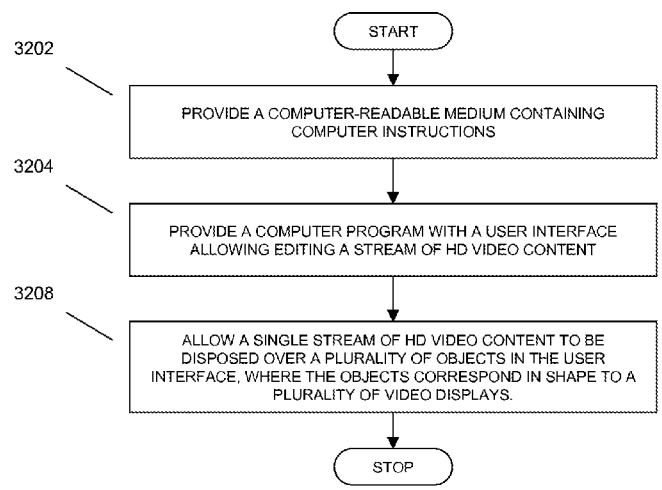
FIG. 32 depicts a generalized system for editing a single stream of video content for display over a plurality of objects.

Referring to FIG. 32, in embodiments, a computer-readable medium containing computer instructions 3202 may be provided. A computer program with a user interface may be provided to allow editing a stream of HD video content 3204. In the user interface, a single stream of video content may be allowed to be disposed over a plurality of objects, where the objects may correspond in shape to a plurality of video displays 3208.

Figure 33:
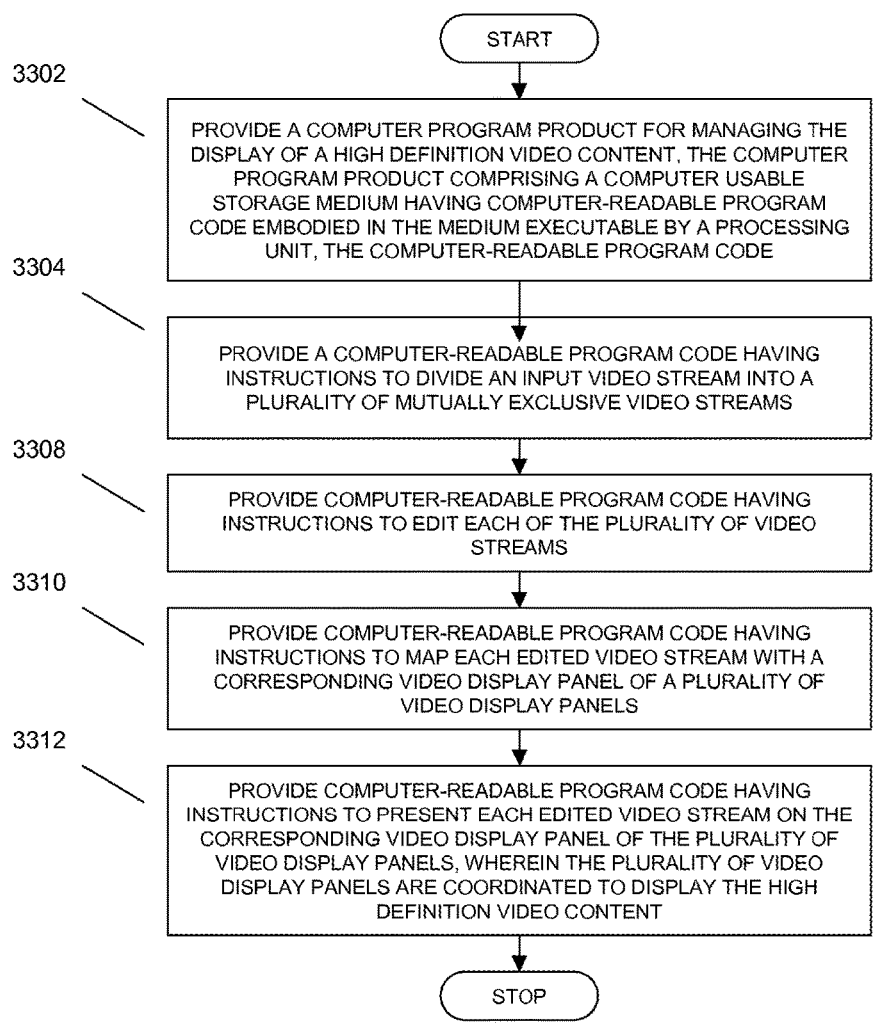
FIG. 33 depicts a generalized system for editing a video stream for display to a plurality of video display panels.

Referring to FIG. 33, in embodiments, a computer program product for managing the display of a high definition video content may be provided. The computer program product may include a computer usable storage medium having computer-readable program code embodied in the medium executable by a processing unit 3302. The computer-readable program code may include instructions to divide an input video stream into a plurality of mutually exclusive video streams 3304, instructions to edit each of the plurality of video streams 3308, instructions to map each edited video stream with a corresponding video display panel of a plurality of video display panels 3310, instructions to present each edited video stream on the corresponding video display panel of the plurality of video display panels where the plurality of video display panels are coordinated to display the high definition video content 3312, and the like.

Figure 34:
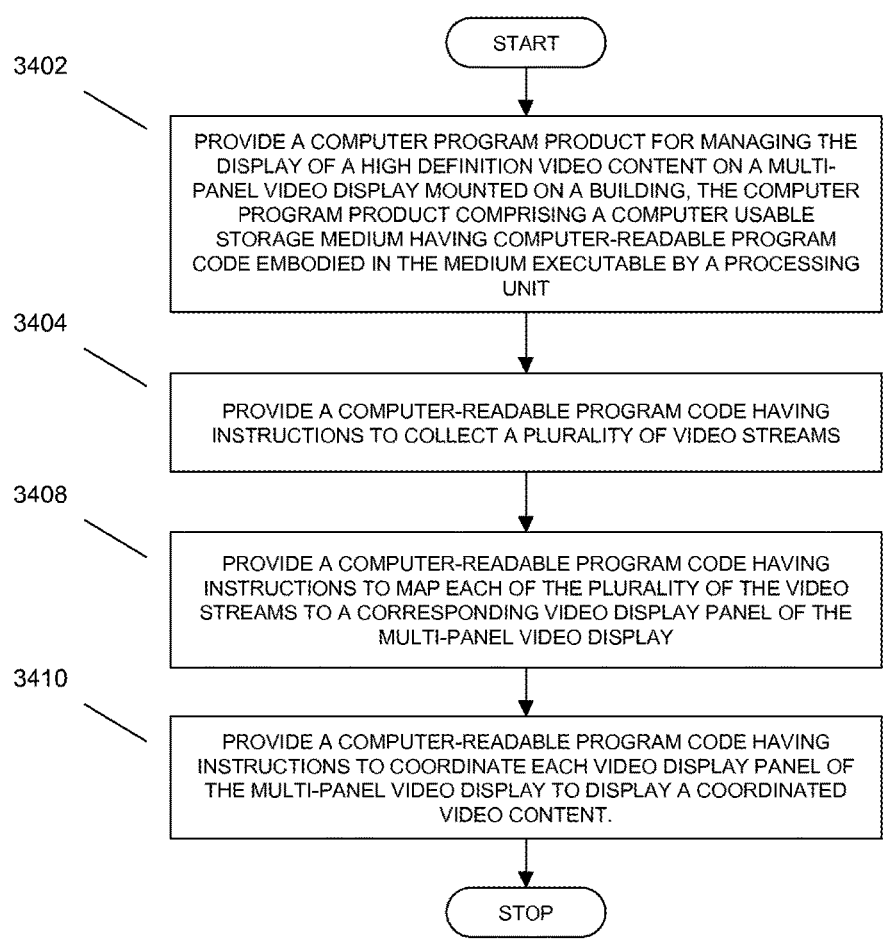
FIG. 34 depicts a generalized system for editing and mapping a video stream for display on a plurality of video display panels.

Referring to FIG. 34, in embodiments, a computer program product for managing the display of a high definition video content on a multi-panel video display mounted on a building may be provided. The computer program product may include a computer usable storage medium having computer-readable program code embodied in the medium executable by a processing unit 3402. The computer-readable program code may include instructions to collect a plurality of video streams 3404, instructions to map each of the plurality of the video streams to a corresponding video display panel of the multi-panel video display 3408, instructions to coordinate each video display panel of the multi-panel video display to display a coordinated video content 3410, and the like.

Figure 35:
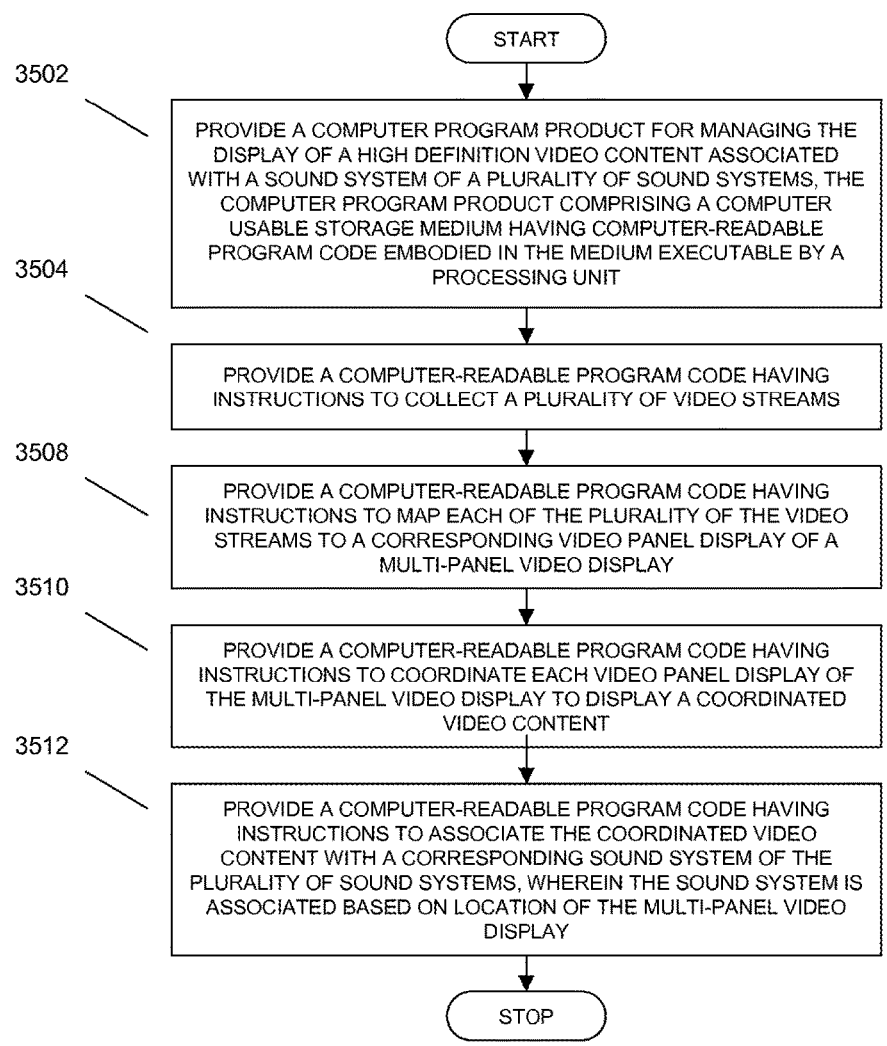
FIG. 35 depicts a generalized system for editing and mapping a video stream for display on a plurality of video display panels and associating the display with a sound system.

Referring to FIG. 35, in embodiments, a computer program product for managing the display of a high definition video content associated with a sound system of a plurality of sound systems may be provided. The computer program product may include a computer usable storage medium having computer-readable program code embodied in the medium executable by a processing unit 3502. The computer-readable program code may include instructions to collect a plurality of video streams 3504, instructions to map each of the plurality of the video streams to a corresponding video panel display of a multi-panel video display 3508, instructions to coordinate each video panel display of the multi-panel video display to display a coordinated video content 3510, instructions to associate the coordinated video content with a corresponding sound system of the plurality of sound systems, wherein the sound system may be associated based on location of the multi-panel video display 3512, and the like.

Figure 36:
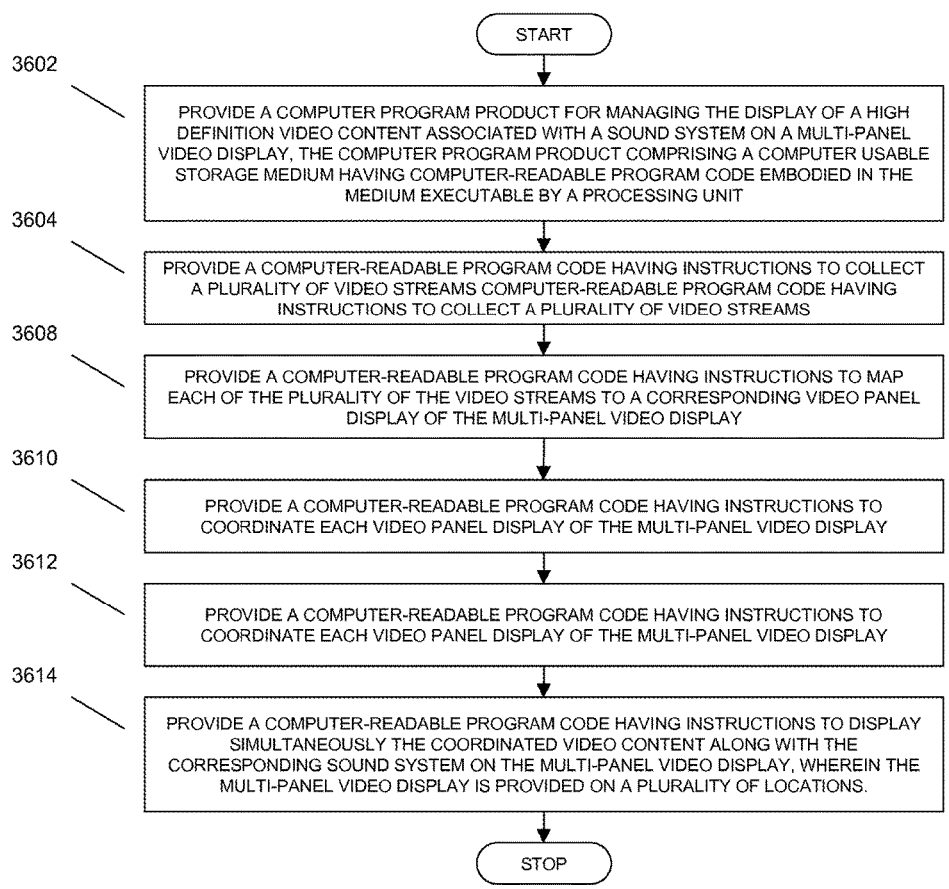
FIG. 36 depicts a generalized system for editing and mapping a video stream for display on a plurality of video display panels, in a plurality of locations, and associating the display with a sound system.

Referring to FIG. 36, in embodiments, a computer program product for managing the display of a high definition video content associated with a sound system on a multi-panel video display may be provided. The computer program product may include a computer usable storage medium having computer-readable program code embodied in the medium executable by a processing unit 3602. The computer-readable program code may include instructions to collect a plurality of video streams 3604, instructions to map each of the plurality of the video streams to a corresponding video panel display of the multi-panel video display 3608, instructions to coordinate each video panel display of the multi-panel video display 3610, instructions to associate the coordinated video content with a corresponding sound system of the plurality of sound systems, wherein the sound system may be associated based on a location of the multi-panel video display 3612, instructions to display simultaneously the coordinated video content along with the corresponding sound system on the multi-panel video display, wherein the multi-panel video display may be provided on a plurality of locations 3614, and the like.

Figure 37:
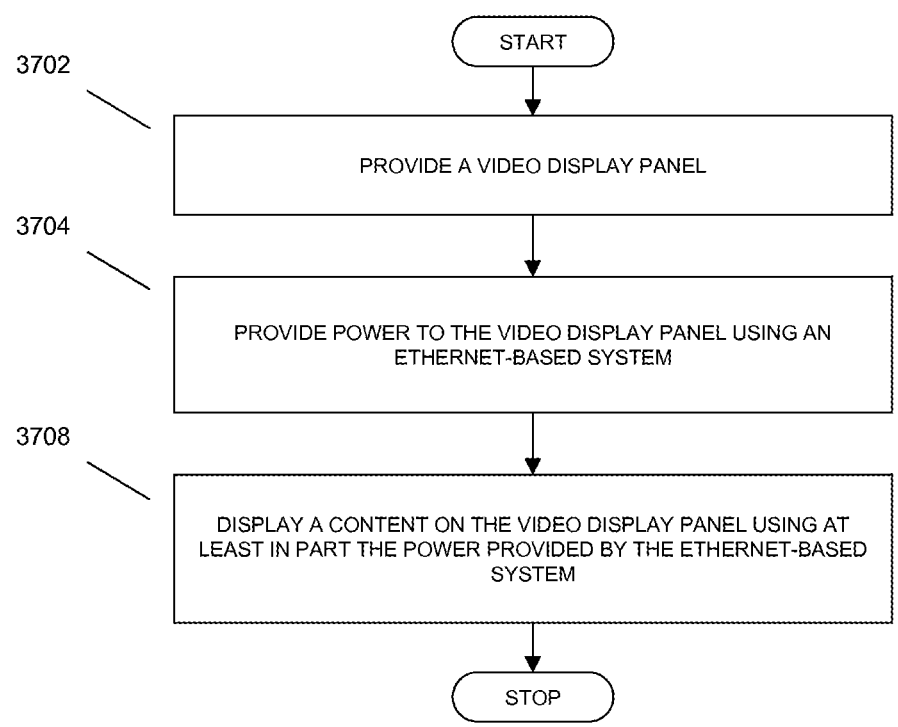
FIG. 37 depicts a generalized method for powering a video display panel using power-over-Ethernet.

Referring to FIG. 37, in embodiments, a video display panel may be provided 3702, which may include power to the video display panel using an Ethernet-based system 3704. In addition, a content on the video display panel may be displayed using at least in part the power provided by the Ethernet-based system 3708. In embodiments, the video display panel may be a multi-panel video display, may be associated with an architectural feature, and the like. In embodiments, the Ethernet-based system may conform to a power-over-Ethernet standard, such as IEEE 802.3af.

Figure 38:
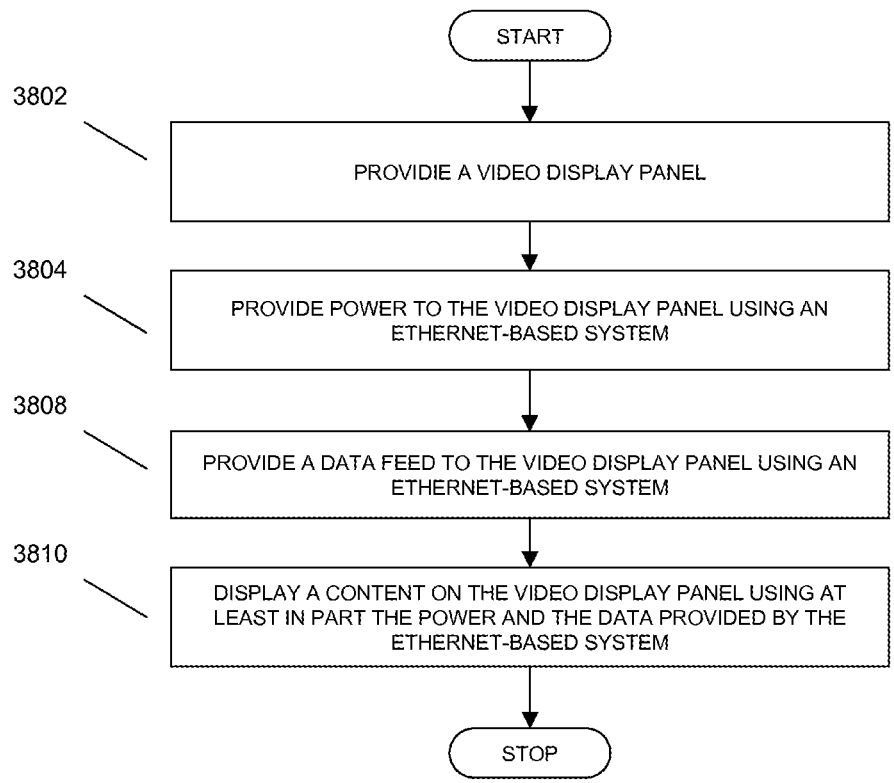
FIG. 38 depicts a generalized method for providing power and data to a video display panel using power-over-Ethernet.

Referring to FIG. 38, in embodiments, a video display panel may be provided 3802, which may include power to the video display panel using an Ethernet-based system 3804. A data feed to the video display panel may be provided using an Ethernet-based system 3808. A content may be displayed on the video display panel using at least in part the power and the data provided by the Ethernet-based system 3810. In embodiments, the Ethernet-based system may be a plurality of Ethernet-based systems. In embodiments, the data may be associated with data from video editing software. In embodiments, the video display panel may be a multi-panel video display, associated with an architectural feature, and the like.

Figure 39:
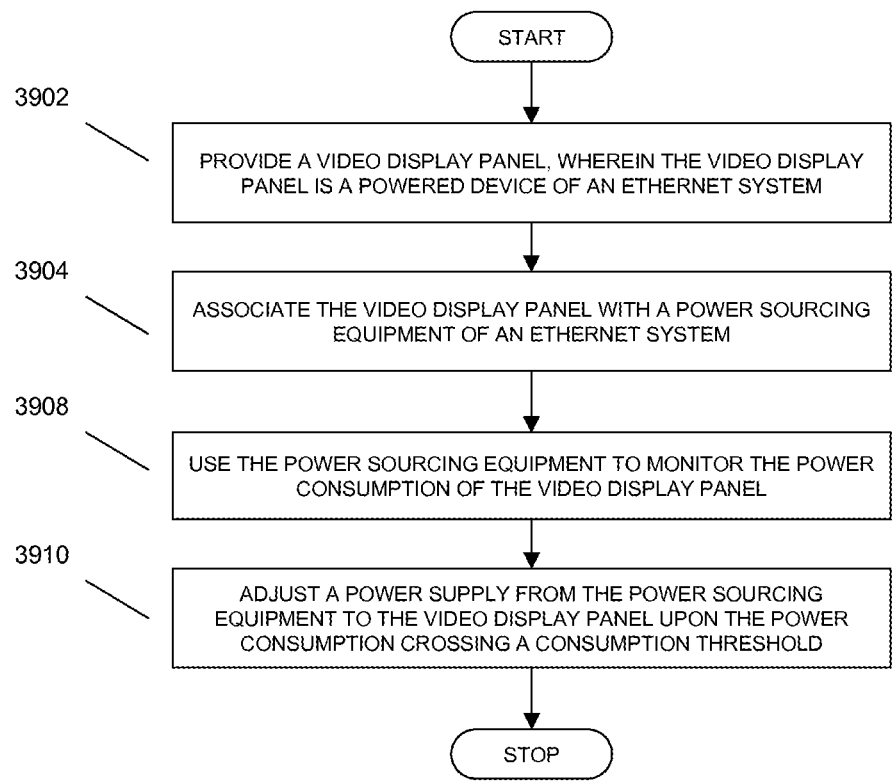
FIG. 39 depicts a generalized method for using a power-over-Ethernet powered device and power sourcing equipment in association with a video display panel.

Referring to FIG. 39, in embodiments, a video display panel may be provided, wherein the video display panel may be a powered device of an Ethernet system 3902. The video display panel may be associated with a power sourcing equipment of an Ethernet system 3904. The power sourcing equipment may be used to monitor the power consumption of the video display panel 3908. A power supply may be adjusted from the power sourcing equipment to the video display panel upon the power consumption crossing a consumption threshold 3910. In embodiments, the power sourcing equipment may be an end-span power sourcing equipment, a mid-span power sourcing equipment, and the like.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and an forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference

What is claimed is:

1. A method for managing power supply to a multi-panel video display, the method comprising:
    managing a display of high definition video content on a multi-panel video display;
    associating a plurality of video panels of the multi-panel video display with a power sourcing equipment such that an amount of power required from the power sourcing equipment to display the high definition video content is classified;
    monitoring a power consumption of one or more video panels of the plurality of video panels using the power sourcing equipment; and
    adjusting a power supply of the power sourcing equipment to the one or more video panels of the plurality of video panels based on the monitored power consumption of one or more video panels of the plurality of video panels in relation to a consumption threshold;
    wherein the power consumption of one or more video panels of the plurality of video panels is based on ambient light in the environment surrounding the one or more video panels of the plurality of video panels, and the adjusted power supply is set to a subset of the amount of power required from the power sourcing equipment to display the high definition video content.

2. The method of claim 1, wherein the power sourcing equipment is an endspan power sourcing equipment.

3. The method of claim 1, wherein the power sourcing equipment is a midspan power sourcing equipment.

4. The method of claim 1, wherein the power consumption being below the consumption threshold is associated with when the ambient light corresponds to a sunrise condition.

5. The method of claim 1, wherein the power consumption being above the consumption threshold is associated with when the ambient light corresponds to a night-time condition.

6. The method of claim 1, wherein the environment is a walkway.

7. The method of claim 1, wherein the environment includes the interior of a tunnel.

8. The method of claim 1, wherein one or more panels of the plurality of video panels is positioned adjacent to a walkway such that the light generated by the one or more panels of the plurality of video panels is incident upon a portion of the walkway.

9. The method of claim 8, wherein the one or more panels of the plurality of video panels positioned adjacent to the walkway providing a sidewall along at least a portion of the walkway.

10. A system for managing a display of high definition video content on a multi-panel video display panel mounted to a building and for managing the corresponding electrical power needs of the supply to a multi-panel video display panel, the system comprising:
    a multi-panel video display comprising a plurality of video panels for displaying high definition video content;
    a non-transitory computer readable medium storing computer program code which, when executed by a processing unit, causes the system to:
    associate the plurality of video panels of the multi-panel video display with a power sourcing equipment such that an amount of power required from the power sourcing equipment to display the high definition video content is classified;
    monitor a power consumption of one or more panels of the plurality of video panels the video display panel using the power sourcing equipment; and
    adjust a power supply of the power sourcing equipment to the one or more panels of the plurality of video panels video display panel based on the monitored power consumption of one or more panels of the plurality of video panels in relation to a consumption threshold;
    wherein the power consumption of one or more panels of the plurality of video panels is based on ambient light in the environment surrounding the one or more panels of the plurality of video panels, and the adjusted power supply is set to a subset of the amount of power required from the power sourcing equipment to display the high definition video content.

11. The system of claim 10, wherein the power sourcing equipment is an endspan power sourcing equipment.

12. The system of claim 10, wherein the power sourcing equipment is a midspan power sourcing equipment.

13. The system of claim 10, wherein the power consumption being below the consumption threshold is associated with when the ambient light corresponds to a sunrise condition.

14. The system of claim 10, wherein the power consumption being above the consumption threshold is associated with when the ambient light corresponds to a night-time condition.

15. The system of claim 10, wherein the environment is a walkway.

16. The system of claim 15, wherein one or more panels of the plurality of video panels is positioned adjacent to a walkway such that the light generated by the one or more panels of the plurality of video panels is incident upon a portion of the walkway.

17. The system of claim 16, wherein the one or more panels of the plurality of video panels positioned adjacent to the walkway providing a sidewall along at least a portion of the walkway.

18. The system of claim 10, wherein the environment includes the interior of a tunnel.

* * * * *